(12) United States Patent
Vakoc

(10) Patent No.: US 6,804,057 B1
(45) Date of Patent: Oct. 12, 2004

(54) VARIOUS METHODS AND APPARATUSES FOR A TUNABLE CHROMATIC DISPERSION COMPENSATOR

(75) Inventor: Ben Vakoc, Palo Alto, CA (US)

(73) Assignee: Novera Optics, Inc., Palo Alto, CA (US)

( * ) Notice: Subject to any disclaimer, the term of this patent is extended or adjusted under 35 U.S.C. 154(b) by 0 days.

(21) Appl. No.: 10/071,145

(22) Filed: Feb. 6, 2002

(51) Int. Cl.[7] .............................................. G02B 5/04
(52) U.S. Cl. ....................... 359/485; 359/494; 359/615; 398/81; 398/147
(58) Field of Search ................................ 359/483, 485, 359/487, 494, 615, 337.5, 153, 161; 385/37; 398/81, 136, 147, 149, 159, 192, 193, 208

(56) References Cited

U.S. PATENT DOCUMENTS

| | | | |
|---|---|---|---|
| 4,828,350 A | | 5/1989 | Kim et al. |
| 5,204,771 A | | 4/1993 | Koga |
| 5,287,214 A | * | 2/1994 | Robertson et al. .......... 359/260 |
| 5,481,402 A | * | 1/1996 | Cheng et al. ............... 359/498 |
| 5,611,004 A | | 3/1997 | Chang et al. |
| 6,097,861 A | * | 8/2000 | Kim et al. ................... 385/27 |
| 6,198,568 B1 | * | 3/2001 | Galvanauskas et al. ..... 359/332 |
| 6,236,495 B1 | * | 5/2001 | Moeller ...................... 359/337 |
| 6,377,391 B1 | | 4/2002 | Vakoc et al. |
| 6,396,629 B1 | * | 5/2002 | Cao ............................ 359/484 |
| 6,396,632 B1 | * | 5/2002 | Liu et al. .................... 359/579 |
| 6,400,868 B1 | * | 6/2002 | Riant et al. .................. 385/37 |
| 6,400,869 B2 | * | 6/2002 | Pan et al. ..................... 385/37 |
| 6,522,467 B1 | * | 2/2003 | Li et al. ...................... 359/484 |
| 2001/0021053 A1 | * | 9/2001 | Colbourne et al. ......... 359/161 |
| 2002/0191912 A1 | * | 12/2002 | Robinson et al. ............ 385/37 |
| 2003/0020989 A1 | * | 1/2003 | Liu et al. .................... 359/161 |
| 2003/0053214 A1 | * | 3/2003 | Yeh et al. ................... 359/577 |
| 2003/0103265 A1 | * | 6/2003 | Gu ............................. 359/484 |

FOREIGN PATENT DOCUMENTS

WO  WO 99/49342 A1  11/1999

OTHER PUBLICATIONS

D. Ostling and H.E. Engan, "Polarization–selective mode coupling in two–mode Hi–Bi fibers," Journal of Lightwave Technology, vol. 15, No. 2, pp. 312–320 (Feb. 1997).

W.P. Risk, G.S. Kino, and B.T. Khuri–Yakub, "Tunable optical filter in fiber–optic form," Optics Letters, vol. 11, No. 9, pp. 578–580 (Sep. 1986).

D.O. Culverhouse, et al., "All–fibre Acousto–optic Tunable Filter Based on a Null Coupler," Optical Communication 1996, ECOC '96, vol. 3, pp. 317–320 (Sep. 15–19, 1996).

H.Y. Rhy, et al., "Self–Switching with a Nonlinear Birefringent Loop Mirror," IEEE Journal of Quantum Electronics, vol. 36, No. 1, pp. 89–93 (Jan. 2000).

(List continued on next page.)

Primary Examiner—John Juba, Jr.
(74) Attorney, Agent, or Firm—Blakely, Sokoloff, Taylor & Zafman LLP

(57) ABSTRACT

Various methods, apparatuses, and systems in which a chromatic dispersion compensation module includes a beam spatial orientation device to separate an optical signal into a first polarized light signal and a second polarized light signal. The second polarized light signal has the posited polarization of the first polarized signal. A wavelength-dependant delay path couples to the beam spatial orientation device. A polarization rotator couples to the wavelength-dependant delay path such that the first polarized light signal reflects into the wavelength-dependant delay path in substantially the opposite direction of the second polarized light signal.

29 Claims, 16 Drawing Sheets

OTHER PUBLICATIONS

B. Crosignani et al., "Kerr Effect and Chromatic Dispersion in Fiber–Optic Gyroscopes", Journal of Lightwave Technology, vol. LT–3. No. 4, (A Joint IEEE/OSA Publication, Aug. 1985, pp. 914–918.

C. Balslev Clausen et al., "Polarization Sensitivity of the Nonlinear Amplifying Loop Mirror", A Publication of the Optical Society of America, Optics Letters, vol. 21, No. 19, Oct., 1996, pp. 1535–1537.

E. Dowling et al., "Lightwave Lattice Filters for Optically Multiplexed Communication Systems", Journal of Lightwave Technology, vol. 12, No. 3, Mar. 1994, pp. 471–486.

D.L. MacFarlane et al., "Three–Mirror Etalons as Bandpass Filters for Modulated Optical Signals", IEEE Photonics Technology Letters, vol. 5, No. 9 Sep. 1993, pp. 1089–1092.

G. Lenz et al., "Dispersive Properties of Optical Filters for WDM Systems", IEEE Journal of QuantumElectronics, vol. 34, No. 8, Aug. 1998, pp. 1390–1402.

C.K. Madsen et al., "An All–Pass Filter Dispersion Compensator using Planar Waveguide Ring Resonators", Bell Laboratories, Lucent Technologies, Room 1D148, 600 Mountain Avenue, Murray Hill NJ 07974, pp. FE6–1/99, 100/FE6–2, FE6–3/01 (3 total).

G. Lenz et al., "Optimal Dispersion of Optical Filters for WDM Systems", IEEE Photonics Technology Letters, vol. 10, No. 4, Apr. 1998, pp. 567–569.

C.K. Madsen et al., "Phase Engineering Applied to Integrated Optic Filters", IEEE 1999, Bell Laboratories, Lucent Technologies, Room 1D148, 600 Mountain Avenue, Murray Hill NJ 07974, pp. 906–907.

C.K. Madsen, "General IIR Optical Filter Design for WDM Applications Using All–Pass Filters", Journal of Lightwave Technology, vol. 18, No. 6, Jun. 2000, pp. 860–868.

C.K. Madsen et al., "A Tunable Dispersion Compensating MEMS All–Pass Filter", IEEE Photonics Technology Letters, vol. 12, No. 6, Jun. 2000, pp. 651–653.

A.H. Gnauck et al., "Optical Equalization of Fiber Chromatic Dispersion in a 5–Gb/s Transmission System", IEEE Photonics Technology Letters, vol. 2, No. 8, Aug. 1990, pp. 585–587.

G. Lenz et al., "Optical Delay Lines Based on Optical Filters", IEEE Journal of Quantum Electronics, vol. 37, No. 4 Apr. 2001, pp. 525–532.

G. Lenz et al., "General Optical All–Pass Filter Structures for Dispersion Control in WDM Systems", Journal of Lightwave Technology, vol. 17, No. 7, Jul. 1999, pp. 1248–1254.

C.K. Madsen, "A Multiport Frequency Band Selector with Inherently Low Loss, Flat Passbands, and Low Crosstalk", IEEE Photonics Technology Letters, vol. 10, No. 12, Dec. 1998, pp. 1766–1768.

C.K. Madsen, "Efficient Architectures for Exactly Realizing Optical Filters with Optimum Bandpass Designs", IEEE Photonics Technology Letters, vol. 10, No. 8, Aug. 1998, pp. 1136–1138.

C.K. Madsen et al., "Optical All–Pass Filters for Phase Response Design with Applications for Dispersion Compensation", IEEE Photonics Technology Letters, vol. 10, No. 7, Jul. 1998, pp. 994–996.

C.K. Madsen et al., "Integrated All–Pass Filters for Tunable Dispersion and Dispersion Slope Compensation", IEEE Photonics Technology Letters, vol. 11, No. 12, Dec. 1999, pp. 1623–1625.

Koichi Takiguchi et al., "Dispersion Compensation Using a Planar Lightwave Circuit Optical Equalizer", IEEE Photonics Technology Letters, vol. 6, No. 4, Apr. 1994, pp. 561–564.

Christi K. Madsen et al., "Increasing the Free Spectral Range of Silica Waveguide Rings for Filter Applications", Opticals Letters/ vol. 23, No. 3/Feb. 1998, pp. 186–188.

Tetsuro Komukai et al., "The Design of Dispersion Equalizers Using Chirped Fiber Bragg Gratings", IEEE Journal of Quantum Electronics, vol. 36, No. 4, Apr. 2000, pp. 409–417.

Masataka Shirasaki, "Virtually Imaged Phased Array", Manuscript received Mar. 11, 1999), Fujitsu Sci. Tech. J., 35, 1, pp. 113–125 (Jul. 1999).

K. Ennser et al., "Influence of Nonideal Chirped Fiber Grating Characteristics on Dispersion Cancellation", IEEE Photonics Technology Letters, vol. 10, No. 10, Oct. 1998.

D.J. Moss, et al., "Multichannel tunable dispersion compensation using all–pass multicavity etalons," OFC 2002 (Mar. 19, 2002).

C.K. Madsen et al., "A Multi–Channel Dispersion Slope Compensation Optical Allpass Filter", Bell Laboratories, Lucent Technologies, Room 1D148, 600 Mountain Avenue, Murray Hill NJ 07974, pp. 94/WF5–1, WF5–2/9, 96/WF5–3 (3 total), published prior to filing date of this application.

C.K. Madsen et al., "Compact Integrated Tunable Chromatic Dispersion Compensator with a 4000 ps/nm Tuning Range", Bell Laboratories, Lucent Technologies, Room 1D148, 6000 Mountain Avenue, Murray Hill, NJ 07974, pp. PD9–1PD9–3, (Oct. 2001).

* cited by examiner

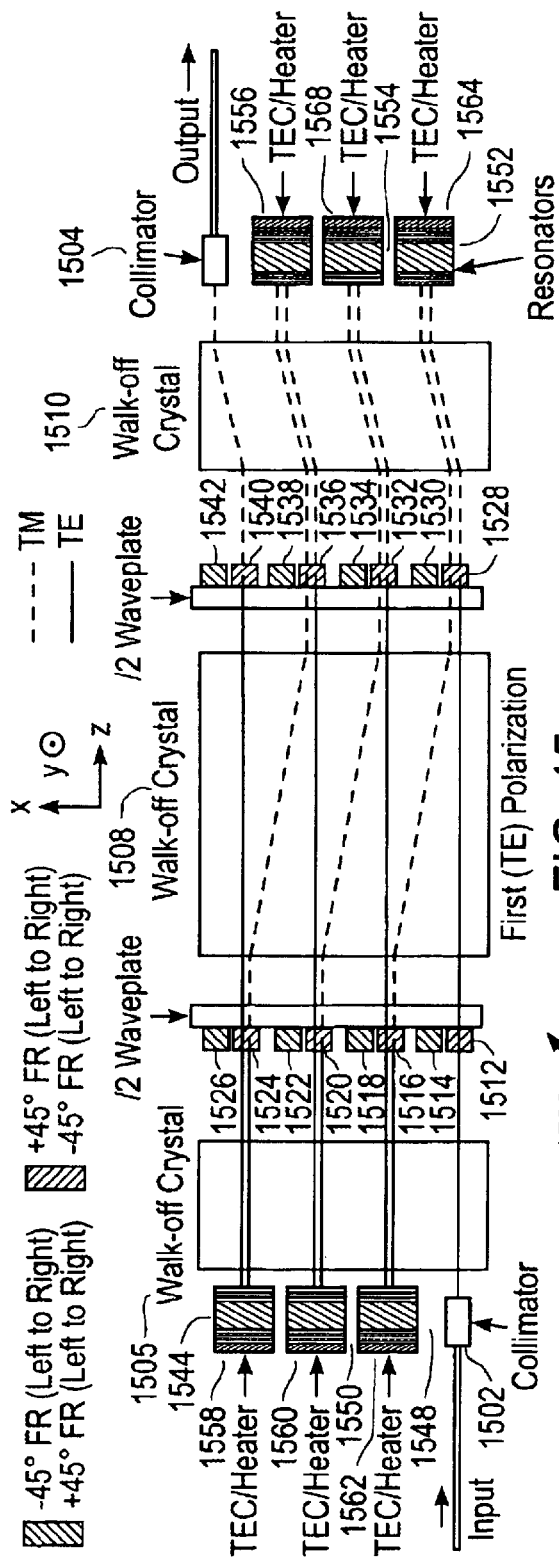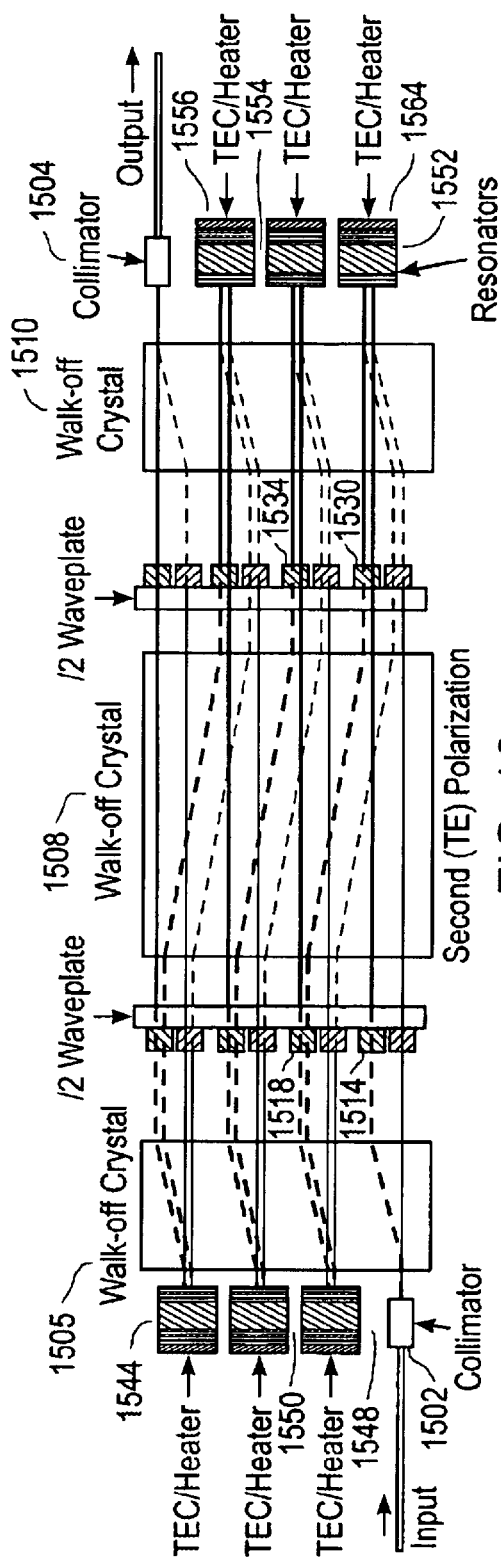
FIG. 15
FIG. 16

VARIOUS METHODS AND APPARATUSES FOR A TUNABLE CHROMATIC DISPERSION COMPENSATOR

FIELD OF THE INVENTION

This invention generally relates to fiber optics. More particularly an aspect of this invention relates to a tunable chromatic dispersion compensating module (DCM) for use in fiber-optic telecommunication systems.

BACKGROUND OF THE INVENTION

Chromatic dispersion is pulse spreading arising from differences in the speed that light of different wavelengths travel through a material, such as fiber optic cable. Chromatic dispersion is the variation in the propagation speed of light as a function of wavelength. Chromatic dispersion causes a distortion of the optical pulses that propagate through a fiber optic transmission line. To compensate for the chromatic dispersion in the fiber spans, chromatic dispersion compensating modules (DCMs) are placed periodically in the transmission line. Chromatic dispersion compensating modules add dispersion to the signal, which is ideally equal and opposite in sign, to counteract the dispersion accumulated in the fiber span. The pulses are then reformed to counteract and eliminate the chromatic dispersion-induced distortion within a passband of wavelengths.

In prior technologies, All-pass filters have been tried in dispersion compensation devices. FIG. 1 illustrates a basic etalon-type all-pass filter. The backside mirror has 100% reflector while the front side mirror can have any reflectivity. The term all-pass means that no fundamental sources of loss in the device exist, and thus, the theoretical amplitude response equals unity at all wavelengths. The etalon-type all-pass filter therefore only effects the phase of the light. Since dispersion is a change in the phase of the light, this type of filter is well suited to chromatic dispersion compensation.

In FIG. 1, the light travels into the basic etalon-type all-pass filter. The light is collimated and sent at normal incidence into the basic etalon-type all-pass filter. The basic etalon-type all-pass filter produces a variation in the time delay due to the resonate circulation of some wavelengths within the cavity. For wavelengths that are at resonance, the light effectively stays inside the cavity longer than for wavelengths that are off resonance. This causes a wavelength-dependent delay that produces dispersion. Light traveling out of the fiber eventually returns to the collimating lens.

FIG. 2 illustrates a chain of resonators coupling to circulators. After the light exits the collimating lens, the light recouples into the fiber where the output light can be separated from the input light with a circulator. Typically, the cascaded circulator method produces a large amount of power loss (~1.5 to 2 dB per resonator) in the light signal being compensated for chromatic dispersion.

FIG. 3 illustrates the chromatic dispersion response of a single basic etalon-type resonator. Each resonator cavity may consist of an all-pass filter from FIG. 2 and generate a wavelength delay, such as 8 ps, at a given wavelength, such as 1548.4 nm. Both the magnitude of the delay, such as 8 ps, and the affected wavelength such as 1548.4 nm may be adjustably controlled by components in the resonator cavity.

FIG. 4 illustrates an exemplary first passband of wavelengths from 1549.1 nm to 1549.3 that incur chromatic dispersion from a set of basic etalon-type resonator to counteract the chromatic dispersion that occurs when those wavelengths propagate through the fiber optic transmission system. A single pulse of light may consist of many wavelengths in a given passband entering a fiber optic transmission system. During the travels through the fiber transmission system that single pulse of light becomes multiple pulses of light slightly separated in time due to effects of chromatic dispersion. Therefore, a chromatic dispersion module's overall goal is to delay wavelengths in a given passband enough to combine all the wavelengths in the passband into a single combine, pulse. In this example, the passband of wavelength from 1549.1 nm wavelengths to 1549.5 nm has dispersed over 80 ps. Thus, the pulse containing the 1549.3 nm wavelength trails the 1549.1 nm pulse by approximately 80 ps.

In order to counteract the chromatic dispersion induced by the fiber optic transmission system, the basic etalon-type all-pass filter produces a delay on all of the wavelengths in the passband to put the wavelengths in the same timeframe.

Various methods, apparatuses, and systems in which a chromatic dispersion compensation module includes a beam spatial orientation device to separate an optical signal into a first polarized light signal and a second polarized light signal. The second polarized light signal has the orthogonal polarization of the first polarized signal. A wavelength-dependent delay path couples to the beam spatial orientation device. A polarization rotator couples to the wavelength-dependant delay path such that the first polarized ligth signal reflects into the wavelength-dependant delay path in substantially the opposite direction of the second polarized light signal.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which:

FIG. 12b illustrates an alternative embodiment of a chromatic dispersion compensation module similar in operation and construction to FIG. 12a;

FIG. 15 illustrates the path of the first polarized light signal through the wavelength-dependant delay path in an alternative embodiment of a chromatic dispersion compensation module; and FIG. 16 illustrates the path of the second polarized light signal through the wavelength-dependant delay path supper imposed over the path of the first polarized light signal in an alternative embodiment of a chromatic dispersion compensation module.

DETAILED DISCUSSION

In general, various methods, apparatuses, and systems are described in which a chromatic dispersion compensation module includes a beam spatial orientation device to separate an optical signal into a first polarized light signal and a second polarized light signal. The second polarized light signal has the orthogonal polarization of the first polarized signal. A wavelength-dependant delay path couples to the beam spatial orientation device. One or more polarization rotator couple to the wavelength-dependant delay path such that the first polarized light signal reflects into the wavelength-dependant delay path in substantially the opposite direction of the second polarized light signal. The wavelengths within a given passband of an optical signal may be routed into cascaded resonator cavities through use of the polarization of a light signal and different angles of reflection that different polarization components possess. The term coupled means connected to another component either directly or indirectly.

Figure 5:
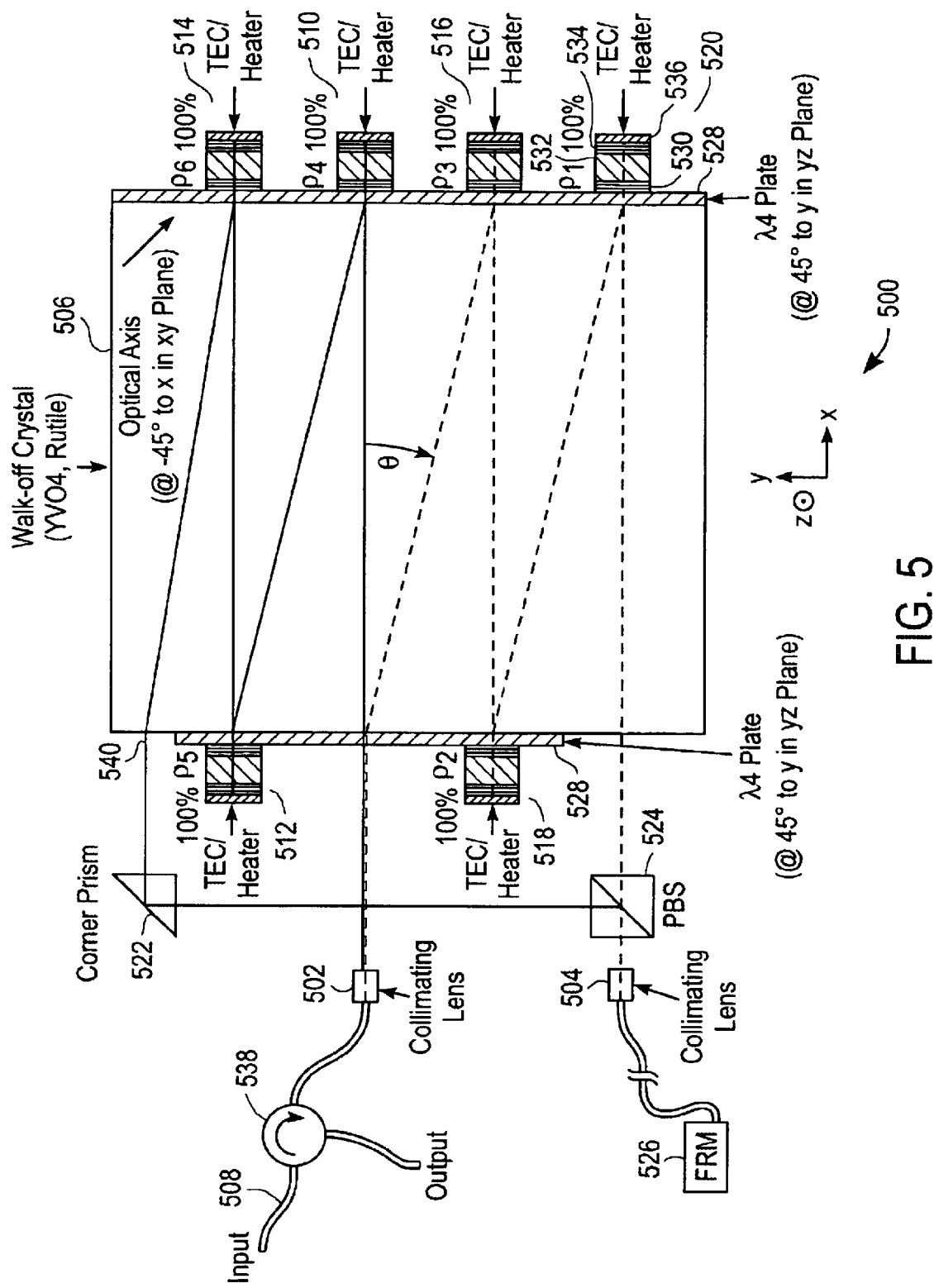
FIG. 5 illustrates an embodiment of a chromatic dispersion compensating module.

FIG. 5 illustrates an embodiment of a chromatic dispersion compensating module (CDCM). For one embodiment, the CDCM 500 includes a first radiation paralleling device 502 such as a collimating lens and a second radiation paralleling device 504 such as a second collimating lens. The CDCM 500 further includes a beam spatial orientation device 506 such as a walk-off crystal and a first wavelength-dependant delay path. The first wavelength-dependant delay path consists of a first resonator cavity 510 through a sixth resonator cavity 520. The first wavelength-dependant delay path further consists of a comer prism 522, a polarization beam splitting prism 524 and a polarization rotator 526, such as a Faraday rotating mirror and the radiation paralleling devices 502,504. For one embodiment, each resonator cavity may comprise a quarter wave plate 528, a partially reflective front side mirror 530 having less then 100% reflectivity, a cavity filling material 532 such as glass, and a back side mirror 534 having a 100% reflectivity. For one embodiment, each resonated cavity couples to a thermal electric cooler/heater 536. In an embodiment, each quarterwave plane has a birefringence axis oriented at 45° to the y or z axis in the yz plane.

For one embodiment, techniques can be used to change the resonant center wavelength for the resonator cavities such as the following. The thermal electric cooler/heater 536 may change the temperature of the resonator cavity to change the index of refraction in each resonator cavity. Also, the thermal electric cooler/heater 536 may change the distance between the front side mirror 530 and back-side mirror 534 through the thermal expansion of the material. The reflectivity of the front side mirror 530 in each resonator cavity may be changed by using dielectric thin-film mirrors. Cavity spacing between the front side mirror 530 and the back side mirror 534 in each resonator cavity may be changed using some form of bulk optics or micro electron mechanical structures (MEMS). Optical wavelengths not resonant with the tuned center wavelength of that resonator cavity incur a smaller delay than wavelengths closer to the resonant wavelength.

An optical signal enters the input 508 of a circulator 538, which routes the optical signal into the first radiation paralleling device 502. The first radiation paralleling device aligns the light rays in the optical signal to all strike the beam spatial orientation device 506 approximately the same angle of incident. The beam spatial orientation device 506 separates the entering optical signal into a first polarized light signal and second polarized light signal. The first polarized light signal may have, for example, a transverse electric wave polarization. The second polarized light signal correspondingly would then have a transverse magnetic polarization. The first polarized light signal may also arbitrary start off with a transverse magnetic wave polarization and correspondingly the second polarized light signal would have a transverse electric polarization.

The first light signal travels straight through the beam spatial orientation device 506 to enter the first resonator cavity 510. The first resonator cavity 510 creates delays for various wavelengths in the first polarized light signal. The effect of the quarter-wave plate 528 is to rotate the first polarized light signal to the orthogonal polarization. Thus, the first polarized light signal exits the first resonator cavity 510 having a transverse magnetic polarization. The first polarized light signal reenters the beam spatial orientation device 506. Due to the transverse magnetic polarization, the beam spatial orientation device 506 reflects the first light signal at an angle of reflection towards the second resonator cavity 512.

For one embodiment, the beam spatial orientation device 506 may be a birefringent walkoff crystal, a polarization beam splitting prism, or a similar component. The beam spatial orientation device 506 generally allows light having a first polarization, such as transverse electric to pass directly through the material while reflecting light having a second polarization at a given angle. The first polarized light signal reflects at a different angle due to the index of refraction that the beam spatial orientation device 506 has for the transverse magnetic wave is different than the index of refraction that the beam special orientation device 506 has for the transverse electric wave.

As noted, the first polarized light signal reflects out of the first resonator cavity 510 at an angle toward the second resonator cavity 512. The first polarized light signal enters the second resonator cavity 512. The second resonator cavity 512 creates wavelength delays in the various wavelengths within the first polarized light signal. As noted above, heating or cooling the second resonator cavity 512 may change the magnitude of the delays. The second resonator cavity 512 also orthogonally polarizes the first polarized light signal. The first polarized light signal exits the second resonator cavity 512 having a transverse electric polarization. When the first polarized light signal having the transverse electric polarization enters into the beam spatial orientation device 506, then the first polarized light signal is not reflected at an angle but rather propagates directly through to the third resonator cavity 514. The third resonator cavity 514 performs similarly to the first resonator cavity 510 and second resonator cavity 512, creating wavelength delay for the various wavelengths within the first polarized light signal and orthogonalizing the first polarized light signal to exit the third resonator cavity 514 with a transverse magnetic polarization. Note, in an embodiment, when the light signal is polarized, then the components of the light; i.e., the TE and TM components, are separated. When a resonator cavity orthogonalizes a polarized light signal, then the resonator cavity in combination with the coupled quarter wave plate or 45 degree faraday rotator rotates the TM and TE polarizations.

The first polarization signal then strikes the interface 540 of the beam spatial orientation device 506 and some other substance such as air. The angle of reflection changes due to the refractive index at that interface 540. The interface 540 routes the first polarized light signal to the comer prism 522. The comer prism 522 reflects the first polarized light signal at a minus 90° angle in order to route the first polarized light signal toward a polarization beam splitting prism 524. When the first polarized light signal strikes the polarized beam splitting prism 524, then the first polarized light signal propagates in roughly a 90° angle towards a second radiation paralleling device 504. Based upon the polarization of the light signal, the polarized beam splitting prism 524 routes the light signal either at a 90° angle or straight through at a 0° angle.

The first polarized light signal exits the second radiation paralleling device 504 toward the polarization rotator 526. The polarization rotator 526 receives the first polarized light signal and orthogonalizes the first polarized light signal to change the polarization from transverse magnetic back to transverse electric. After reflecting off the polarization rotator 526, the first polarized light signal then travels through the second radiation paralleling device 504 into the polarization beam splitting prism 524 with a transverse electric polarization.

When the light signal, now having a transverse electric polarization, strikes the polarization beam splitting prism 524, then the light signal travels directly through the polarization beam splitting prism 524 without being reflected at a 90° angle. Thus, the first polarized light signal having a transverse electric polarization couples to the beam spatial orientation device 506 and onto the sixth resonator cavity 520.

The sixth resonator cavity 520 induces wavelength delay effects into the first polarized light signal and orthogonalizes the first polarized light signal. The first polarized light signal exits the sixth resonator cavity 520 and couples to the beam spatial orientation device 506. The first polarized light signal having a transverse magnetic polarization reflects at an angle towards the fifth resonator cavity 518. Similarly, the fifth resonator cavity 518 induces wavelength delay into the first polarized light signal and orthogonalizes the first polarized light signal. The first polarized light signal continues in the wavelength-dependant delay path to the fourth resonator cavity 516 and then out of the fourth resonator cavity 516 back to the first radiation paralleling device 502. Upon exiting the first radiation paralleling device 502, the first polarized light signal enters into the circulator 538. The circulator sends the combined first polarized light signal and second polarized back out into the optic transmission system.

The second polarized light signal having started off in the transverse magnetic polarization, travels substantially the same wavelength-dependant delay path, however, the second polarized light signal propagates through this wavelength-dependant delay path in the opposite direction of the first polarized light signal.

Thus, the second polarized light signal separates in the beam spatial orientation device 506 and propagates to the fourth resonator cavity 516, to the fifth resonator cavity 518, and to the sixth resonator cavity 520. The second polarized light signal exits the sixth resonator cavity 520 with a transverse electric polarization. The second polarized light signal having a transverse electric polarization exits the beam spatial orientation device 506 to couple into the polarization beam splitting prism 524.

Upon propagating directly through the polarization beam splitting prism 524 due to the transverse electric polarization, the second polarized light enters the second radiation paralleling device 504 to reflect off the polarization rotator 526. The polarization rotator 526 orthogonalizes the second polarized light signal to change the second polarized light signal to have the transverse magnetic polarization. The second polarized light signal propagates through the second radiation paralleling device 504 to strike the polarization beam splitting prism 524. The second polarized light signal now possesses a transverse magnetic polarization and reflects at a 90° angle from the polarization beam splitting prism 524 up towards the corner prism 522. The second polarized light signal then propagates towards the comer prism 522.

The second polarized light signal continues its travel in the opposite direction of the first polarized light signal into the third resonator cavity 514, then the second resonator cavity 512, then the first resonator cavity 510, and out to the first radiation paralleling device 502. Each resonator cavity 510–520 induces a wavelength delay in the second polarized light signal. Each resonator cavity 510–520 may have a different center resonant wavelength.

For one embodiment, each resonator cavity 510–520 may cause a different wavelength delay through varying the refractive index of that cavity. For one embodiment, the refractive index of the resonator cavity depends upon the temperature of that cavity, the reflectivity of the front mirror, since the front mirror has reflectivity of less then 100%, and the spacing or physical depth of the cavity. According to principles described later, a change in the refractive index of the resonator cavity causes a change in the delay of a given wavelength.

The effect of the quarter-wave plate 528 is to rotate the polarization of the output light by 90° relative to the input light. One pass through the quarter wave plate 528 rotates light from a linear polarization to a circular polarization. The light passes through the quarter wave plate 528 twice, once entering the quarter wave plate 528 and after reflecting from the backside mirror 534 the light exiting the quarter wave plate 528. The light therefore travels at an angle of approximately 6° in the beam spatial orientation device 506. When this light reaches the other side of the beam spatial orientation device 506, another quarter-wave plate and resonator cavity is encountered and the same process is repeated. The routing of the light through the polarization of the light can be repeated for an arbitrary number of resonators. Each resonator stage induces a tunable delay in the passband of wavelengths.

For one embodiment, the CDCM 500 induces little to no Polarization Dependant Loss or Polarization Mode Dispersion because the first polarized light signal and the second polarized light signal eventually travel substantially the same path through the device.

Figure 6:
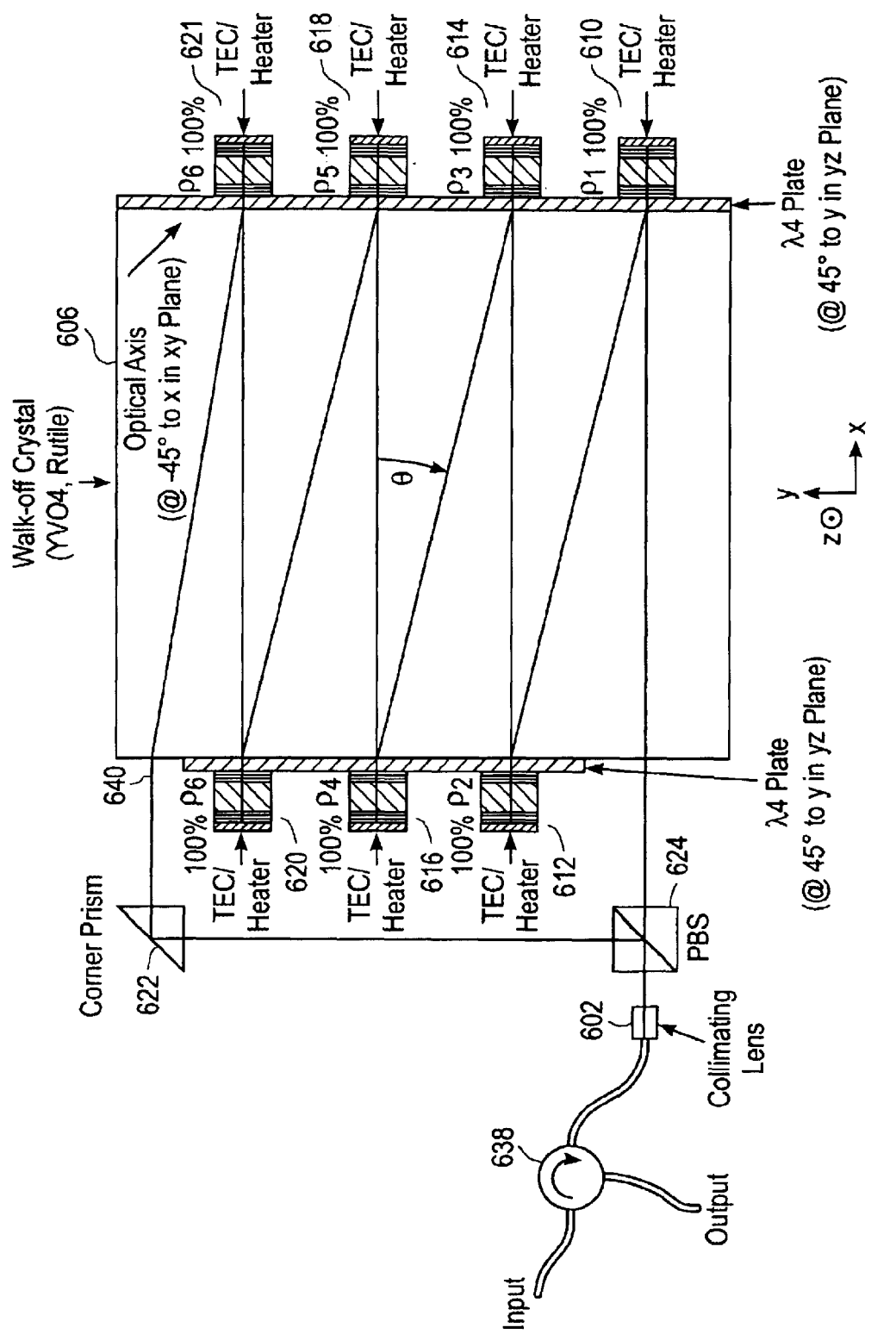
FIG. 6 illustrates an alternative embodiment of a chromatic dispersion compensating module without an additional polarization rotator.

FIG. 6 illustrates an alternative embodiment of a chromatic dispersion compensating module without an additional polarization rotator. The chromatic dispersion compensation module 600 includes a beam spatial orientation device 606, a first resonator cavity 610 through a seventh resonator cavity 621, a corner prism 622, a polarization beam splitting prism 624, and a first radiation paralleling device 602. An entering optical signal exits the circulator into the radiation paralleling device 602. This chromatic dispersion compensation module 600 operates similarly to the chromatic dispersion compensation module described in FIG. 5. The optical signal strikes the polarization beam splitting prism 624 and separates into two beams. The first polarized light signal contains light in a first transverse magnetic polarization and reflects from the polarization beam splitting prism 624 at a 90° angle up into the corner prism 622.

The comer prism 622 reflects the first polarized light signal at a 90° into an interface 640 consisting of air and the beam spatial orientation device 606. The angle of reflection for the first polarized light signal changes and directs the first polarized light signal towards the seventh resonator cavity 621. Each resonator cavity that the first polarized light signal travels through induces delays in the various wavelengths in the first polarized light and orthogonalizes the first polarized light signal. Each resonator cavity may be tuned to a different resonant wavelength and create different delays in the pass band of the wavelengths from the first polarized light signal and the second polarized light signal.

The first polarized light signal exits the seventh resonator cavity 621. The first polarized light signal possesses a transverse electric polarization and propagates toward the sixth resonator cavity 620. The first polarized light signal continues to propagate through the fifth resonator cavity 618, the fourth resonator cavity 616, the third resonator cavity 614, the second resonator cavity 612, and the first resonator cavity 610. Upon exiting the first resonator cavity 610, the first polarized light signal possesses a transverse electric polarization. The first polarized light signal enters the polarization beam splitting prism 624 and propagates directly through the polarization beam splitting prism 624 into the first radiation paralleling device 602 because the first polarized light signal possesses a transverse electric polarization. In an alternative embodiment, the polarization beam splitting prism 624 reflects transverse electric polarized light and passes transverse magnetic polarized light.

The second polarized light signal travels substantially the same wavelength-dependant delay path through each of the resonator cavities 610–621 except in an opposite direction. Thus, the second polarized light signal possessing a transverse electric polarization originally propagates through the polarization beam splitting prism 624 to the first resonator cavity 610. The first resonator cavity 610 induces wavelength delays into the second polarized light signal and orthogonalizes the second polarized light signal. After proceeding through the second resonator cavity 612 thru the seventh resonator cavity 621, the second polarized light signal reflects from the corner prism 622 at a 90° angle down to the polarization beam splitting prism 624. The second polarized light signal possessing a transverse polarized magnetic polarization strikes the polarization beam splitting prism 624 and reflects at a 90° angle into the radiation paralleling device 602. The second polarized light signal rejoins the first polarized light signal. Both polarized light signals have wavelength delays induced into the their respective signals. The combined light signal then routes back into the circulator 638.

For one embodiment, the comer prism 622 consists of a mounted glass (SiO$_2$, BK7) plate with angled sides. The end surfaces of the glass plate have dielectric coatings that allow them to operate as 100% reflectors.

Figure 7:
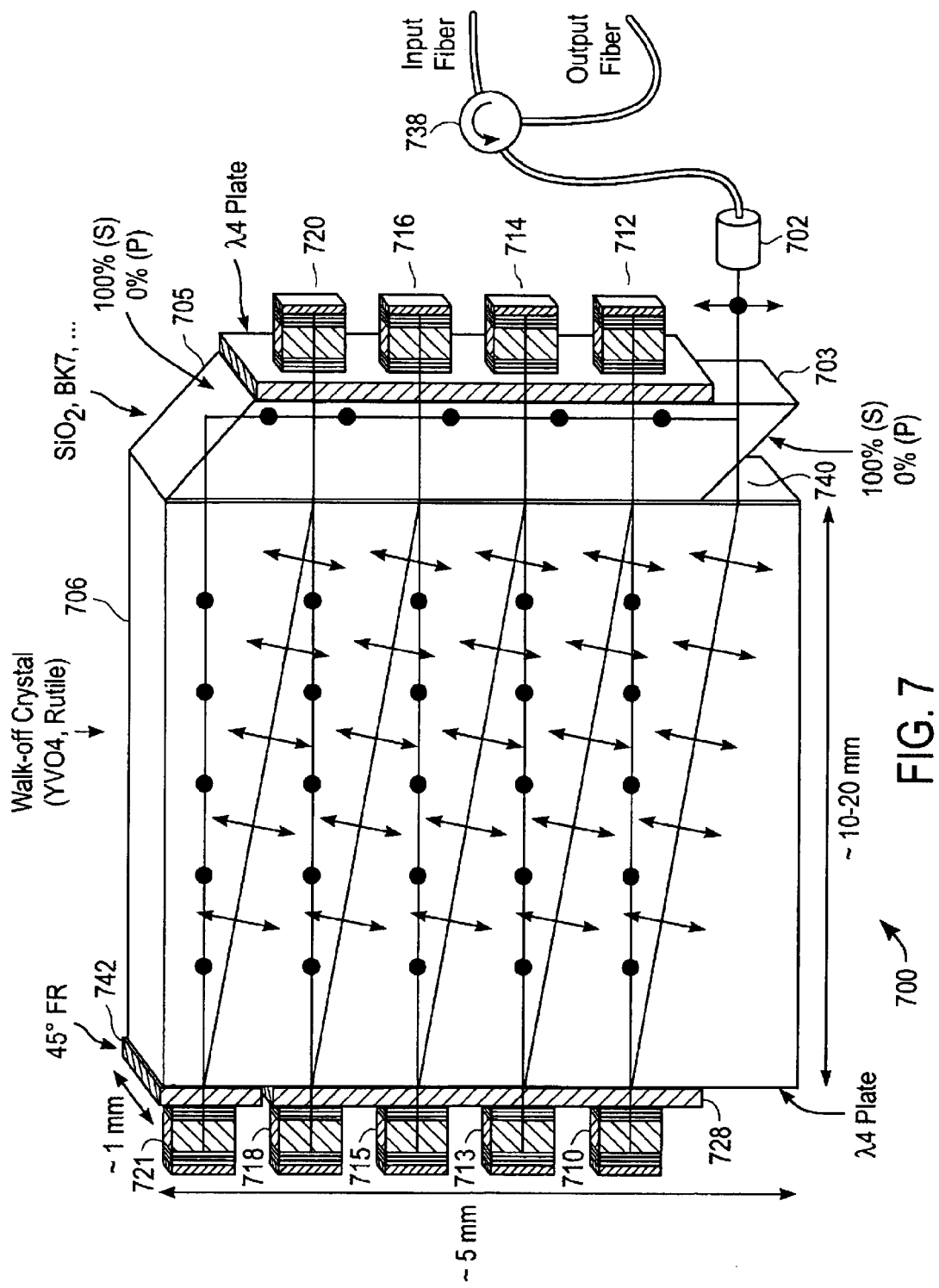
FIG. 7 illustrates an alternative embodiment of a chromatic dispersion compensation module.

FIG. 7 illustrates an alternative embodiment of a chromatic dispersion compensation module. The chromatic dispersion compensation module 700 includes a first radiation paralleling device 702, a first beam spatial orientation device 703, a second beam spatial orientation device 705, a first resonator cavity 710 through a ninth resonator cavity 721 and a third beam spatial orientation device 706. The optical signal exits the first radiation paralleling device 702 and enters the first beam spatial orientation device 703. The first beam spatial orientation device 703 separates the optical signal into the first polarized light signal and the second polarized light signal as described above.

The first polarized light signal having a transverse magnetic polarization reflects at a 90° angle from its angle of incident into the first beam spatial orientation device 703 up toward the second beam special orientation device 705. The second beam spatial orientation device 705 reflects the first polarized light signal having a transverse magnetic polarization at a 90° angle towards the ninth resonator cavity 721. The first polarized light signal then propagates through the nine cascaded resonator cavities 710–721 in order to incur various wavelength delays. The first polarized light signal exits the first resonator cavity 710 angled towards an interface 740 and then directed to the first beam spatial orientation device 703. At the interface 740 of the third beam spatial orientation device 706 and, for example, a glass boundary, the first polarized light signal reflects due to the index of refraction at that interface 740.

The first polarized light signal having a transverse electric propagation propagates directly through the first beam spatial orientation device 703 without being reflected due to the polarization of the first polarized light signal. The first polarized light signal couples from the first polarization beam spatial orientation device 703 to the radiation paralleling device 702 and out to the circulator 738.

The second polarized light signal originating with a transverse electric polarization travels substantially the opposite wave length delay path through the first beam spatial orientation device 703, interface 740, the nine cascaded resonator cavities 710–721, third beam spatial orientation device 706, and the second beam spatial orientation device 705. The second polarized light signal recombines with the first polarized light signal in the radiation paralleling device 702. The combined signal propagates out to the circulator 738 in order to reenter the fiber optic transmission system.

For one embodiment, a resonator cavity such as the ninth resonator cavity may have a 45° Faraday rotator 742 rather than a quarter wave plate 728. The 45° Faraday rotator 742 and the quarter wave plate 728 perform a similar function, which is to induce an orthogonal polarization onto an entrant light signal. Thus, a light signal such as the first polarized light signal enters through the 45° Faraday rotator 742 into the resonator cavity and exits through the 45° Faraday rotator 742 orthogonally polarized.

Figure 8:
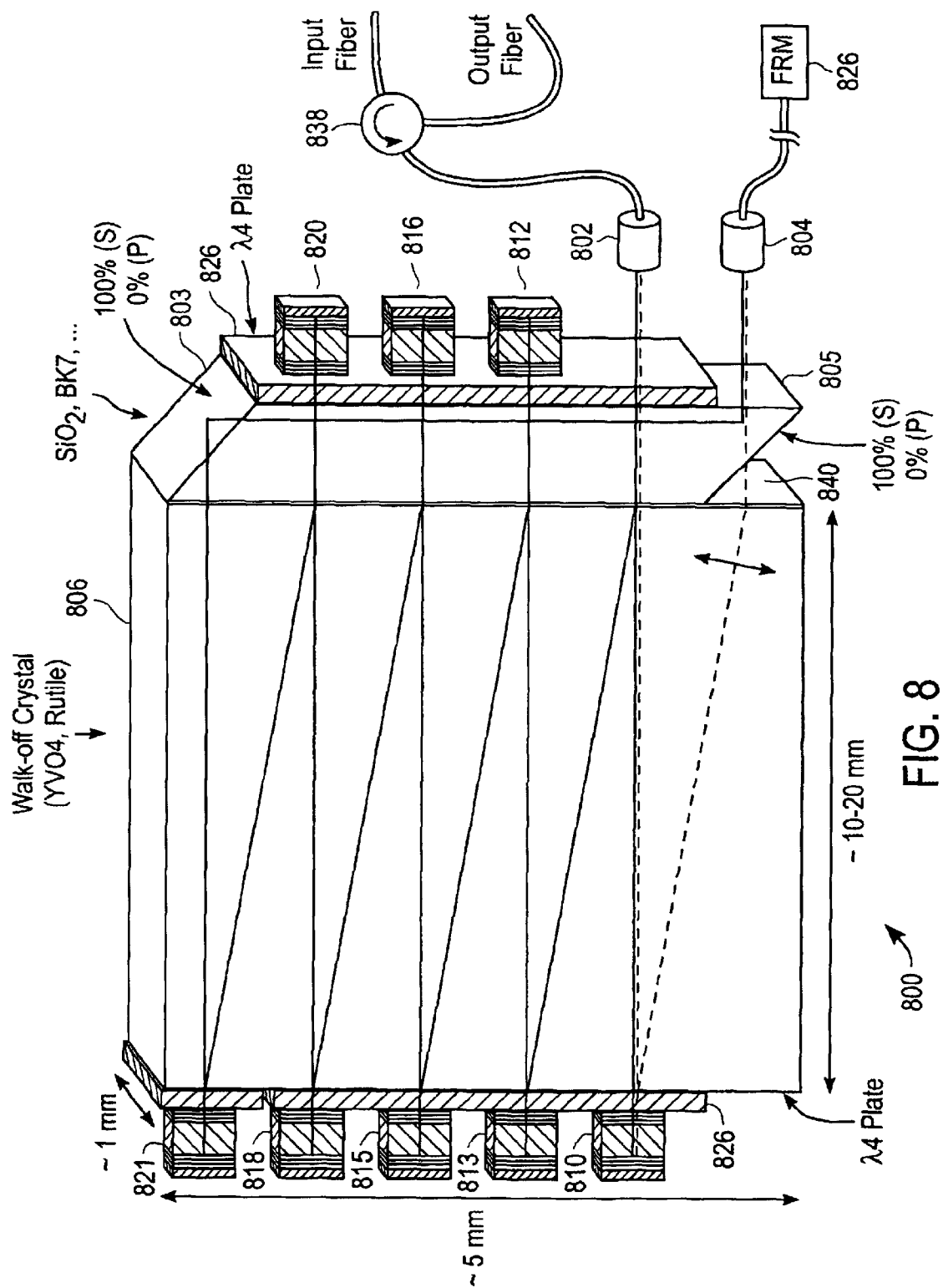
FIG. 8 illustrates an alternative embodiment of a chromatic dispersion compensation module.

FIG. 8 illustrates an alternative embodiment of a chromatic dispersion compensation module. The chromatic dispersion compensation module 800 in FIG. 8 operates similarly and contains similar components as are in FIG. 7. Referring to FIG. 8, the chromatic dispersion compensation module 800 contains eight cascaded resonator cavities 810–821 rather than nine and has the additional components of a second radiation paralleling device 804 and an additional polarization rotator 826 such as a Faraday rotating mirror 825. Note, each combination of quarter wave plate 826 and resonator cavity 810–821 form a polarization rotator.

A first polarized light signal, having a transverse magnetic polarization, travels approximately the same path as shown in FIG. 8. However, when the first polarized light signal having now a transverse electric polarization exits the first resonator cavity 810 instead of the first polarized light signal being routed towards the first radiation paralleling device 802 and back out to the circulator 838, the first polarized light signal is routed towards a second radiation paralleling device 804.

The first polarized light signal propagates through the third beam spatial orientation device 806 to couple to an air to walk-off crystal interface 840. The first polarized light signal then propagates through the first beam spatial orientation device 805 into a second radiation paralleling device 804. The second radiation paralleling device 804 couples the first polarized light signal to a polarization rotator 826 to change the polarization of the first polarized light signal to the orthogonal polarization state which now matches the entrant polarization of that first polarized light signal. The first polarized light signal may travel through one or more additional chromatic dispersion modules prior to reaching the terminating polarization rotator 825.

The first polarized light signal reflects from the polarization rotator 826 now possessing the same polarization as it had when the polarized light signal entered the first beam spatial orientation device 805. The first polarized light signal routes back through the second radiation paralleling device 804 to the wavelength-dependant delay path again. The first polarized light signal reflects up due to the first beam spatial orientation device 805 and travels through resonator cavities 821–813 to the first radiation paralleling device 802. The first polarized light signal recombines with the second polarized light signal and couples to the circulator 838.

The second polarized light signal upon exiting the first radiation paralleling device 802 is transmitted through the first beam spatial orientation device 805 and travels through resonator cavities 813–821 to second beam spatial orientation device 803, to first beam spatial orientation device 805, to second radiation paralleling device 804, to polarization rotator 826, back to first beam spatial orientation device 805, to the first resonator cavity 810, and then out to the second radiation paralleling device 802.

Each chromatic dispersion compensation module 800 contains a stage of wavelength delays. As noted above, multiple chromatic dispersion compensation modules may be cascadedly connected together with the last chromatic dispersion compensation module terminated with a polarization rotator 826, such as a Faraday rotating mirror.

Figure 9:
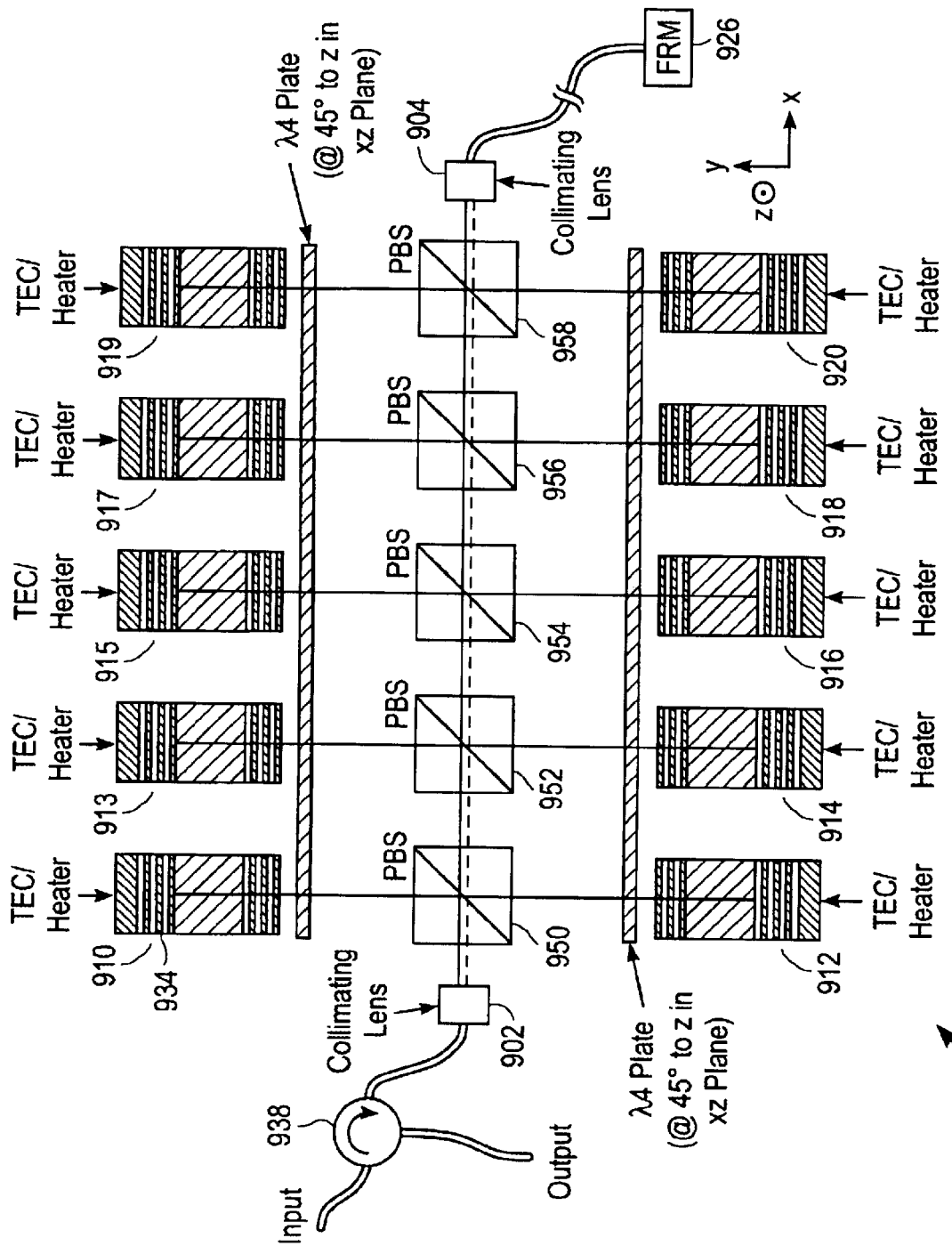
FIG. 9 illustrates an alternative embodiment of chromatic dispersion compensation module.

FIG. 9 illustrates an alternative embodiment of chromatic dispersion compensation module. The chromatic dispersion compensation module 900 may include five stages of beam spatial orientation devices 950–958, such as polarization beam splitting prisms, ten stages of resonator cavities, such as a first resonator cavity 910 through a tenth resonator cavity 920, ten polarization rotators, such as each quarter wave plate 928 coupled to each of the ten resonator cavities 910–920, a first radiation paralleling device 902 and a second radiation paralleling device 904, and an eleventh polarization rotator 926.

The chromatic dispersion compensation module operates similarly to the other embodiments. The entering optical signal is separated by the first beam spatial orientation device 950 into a first polarized light signal and a second polarized light signal, both light signals having orthogonal polarization. The first polarized light signal having, for example, a transverse magnetic polarization is reflected at a 90° angle up into the first resonator cavity 910. After traveling through the quarter-wave plate 928, reflecting off the backside mirror 934 of the resonator, and traveling back through the quarter-wave plate 928, the first polarized light signal is polarized in the transverse electric. The first polarized light signal then propagates directly through the first beam spatial orientation device 950 to the second resonator cavity 912.

The first polarized light signal returns from the second resonator cavity 912 to the first beam spatial orientation device 950 with a transverse magnetic polarization. Due to the polarization, the first polarized light signal reflects at a 90° angle from the first beam spatial orientation device 950 towards the second beam spatial orientation device. This pattern is repeated until the light has traveled through each of the resonators 910–920 and is coupled to the second radiation paralleling device 904.

The second polarized light signal having a transverse electric polarization propagates directly through the five beam spatial orientation devices 950–958 into a second radiation paralleling device 904 and onto the eleventh polarization rotator 926. Upon exiting the eleventh polarization rotator 926, the second polarized light signal now possesses the transverse magnetic polarization and reflects at a minus 90° angle when striking the fifth beam spatial orientation device 958. The second polarized light signal enters the tenth resonator cavity 920. The second polarized light signal then propagates through the wavelength-dependant delay path consisting of the resonator cavities 910–920, the quarter wave plates 928, and the beam spatial orientation devices 950–958, however in the reverse path that the first polarized light signal is propagating through this wavelength path. Eventually, both light signals having traveled substantially the same paths in opposite directions of each other arrive back at the first radiation paralleling device 902. Both light signals combine and couple back out to the input output circulator 938. The input output circulator 938 couples the chromatically dispersion compensated light signal back into the fiber optics transmission system.

Figure 10:
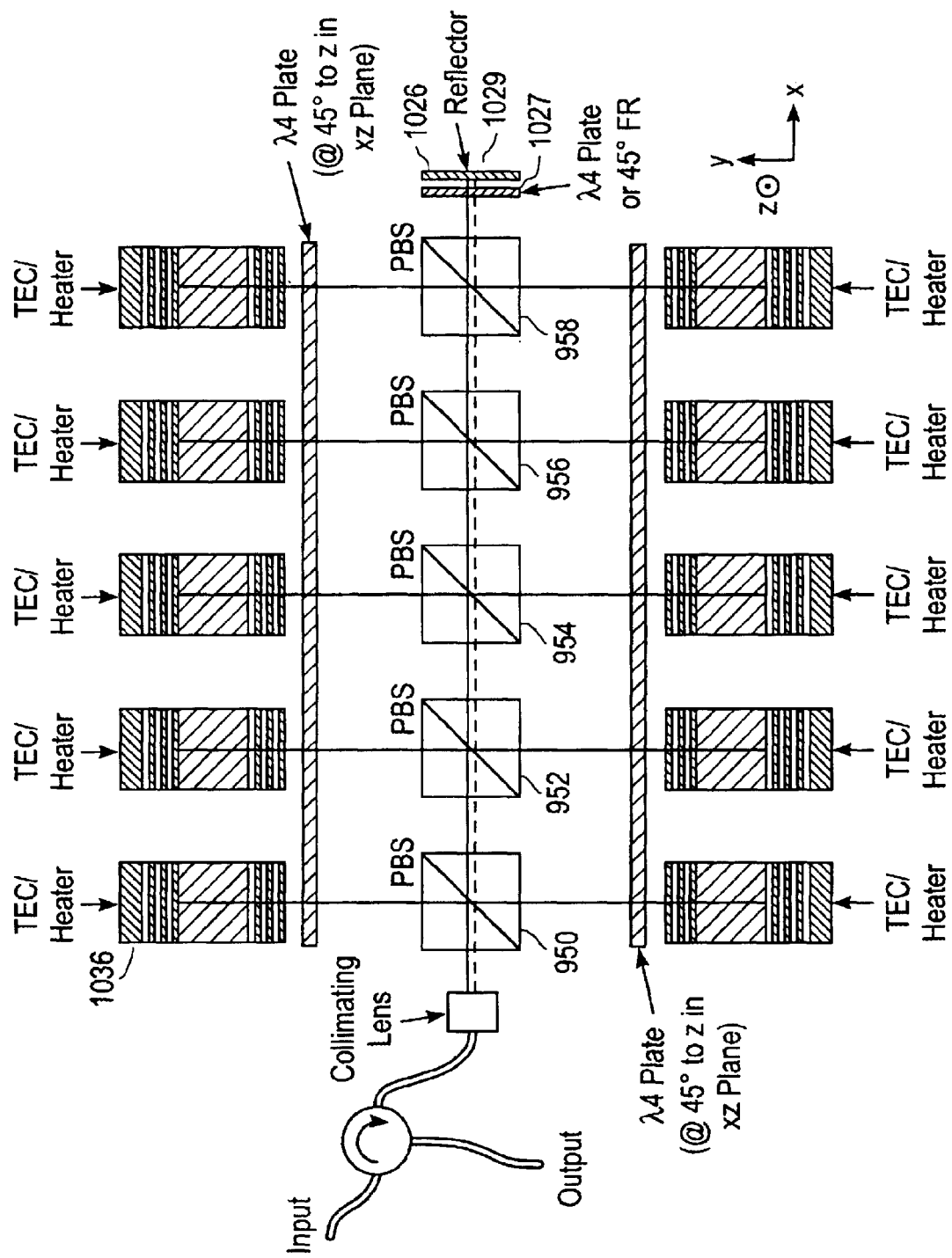
FIG. 10 illustrates an alternative embodiment of a chromatic dispersion compensation module.

FIG. 10 illustrates an alternative embodiment of a chromatic dispersion compensation module. The chromatic dispersion compensation module 1000 includes similar components to the chromatic dispersion compensation module described in FIG. 9. Referring to FIG. 10, the chromatic dispersion compensation module 1000 includes an additional quarter wave plate 1027 with a birefringent axis oriented at 45° with respect to the y or z axis in the yz plane and a reflector 1029 to make up the eleventh polarization rotator 1026. Thus, this embodiment eliminates the second radiation paralleling device. In an alternative embodiment, a 45 degree Faraday rotator substitutes for the quarter wave plate 1027.

The first polarized light signal and the second polarized light signal travel similarly through this embodiment of the chromatic dispersion compensation module 1000 as they did in the chromatic dispersion compensation module in described in FIG. 9.

Each resonator cavity has either a thermal electric cooler (TEC) or a heater 1036 attached to each resonator cavity. The wavelength delay affects that each resonator cavity has on a given path band of wavelengths may be controlled and tuned through changing the refractor index of that resonator cavity. The thermal electric cooler/heater 1036 acts to control the temperature of the resonator cavity in order to control the amount of delay incurred by the various wavelengths in the light signals passing through that resonator cavity.

Figure 11:
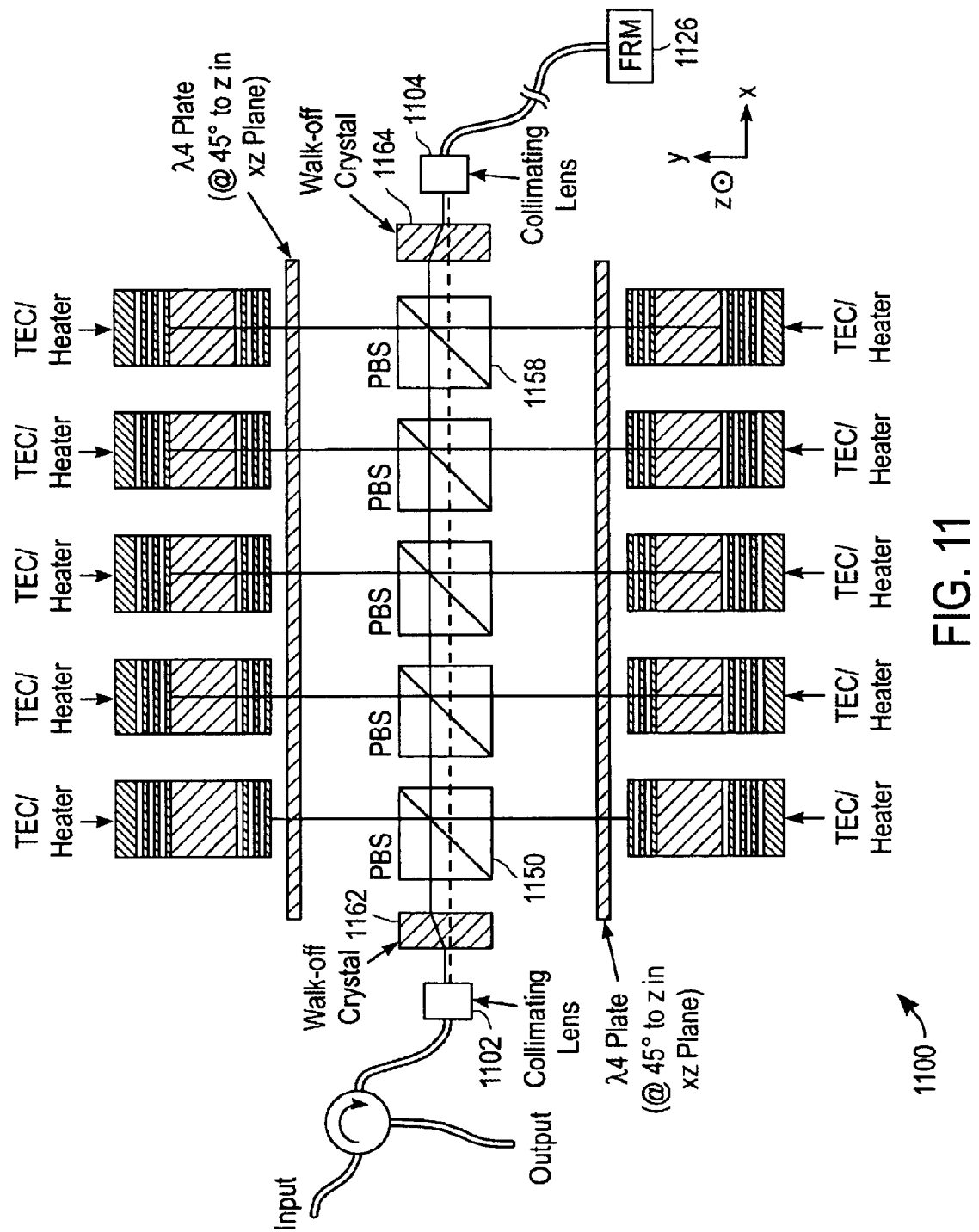
FIG. 11 illustrates an alternative embodiment of a chromatic dispersion compensation module.

FIG. 11 illustrates an alternative embodiment of a chromatic dispersion compensation module. The chromatic dispersion compensation module 1100 includes similar components as described in FIG. 9. The chromatic dispersion compensation module 1100 includes additional components of a first walk-off crystal 1162 and a second walk-off crystal 1164. The first walk-off crystal 1162 couples between the first radiation paralleling device 1102 and the first beam spatial orientation device 1150. The second walk-off crystal 1164 couples between the fifth beam spatial orientation device 1158 and the second radiation paralleling device 1104.

For one embodiment, polarized beam splitting prisms do not have as good extinction ratios as walk-off crystals. Thus, when the optical signal is separated by a polarized beam splitting prism into a first polarized light signal having a first polarization such as transverse magnetic and the second polarized light signal having a second polarization, then the first polarized light signal may have mostly a transverse magnetic polarization but may also partially include a traverse electric polarization. The addition of the walk-off crystals more distinctly separates the first polarized light signal and the second polarized light signal into discreet polarized light signals having mainly one polarization.

Thus, the first walk-off crystal 1162 exists at essentially the entrance,to the chromatic dispersion compensation module 1100. The second walk-off crystal 1164 exists at the exit from the eleventh polarization rotator 1126 to separate that return polarized light signal into a distinct polarization. The first polarization such as transverse electric propagates directly through the walk-off crystals without being reflected. Thus, only the transverse magnetic polarization reflects at an angle due to the index of refraction of the walk-off crystal. However, the first polarized light signal possesses the transverse electric polarization upon reflecting from the eleventh polarization rotator 1126 and the second walk-off crystal 1164 act to separate the polarization of the first polarized light signal. For one embodiment, the walk-off crystal is placed before the fibers to prevent light that is unsuitably reflected by the polarized beam splitting prism from recoupling into the fibers.

Figure 12A:
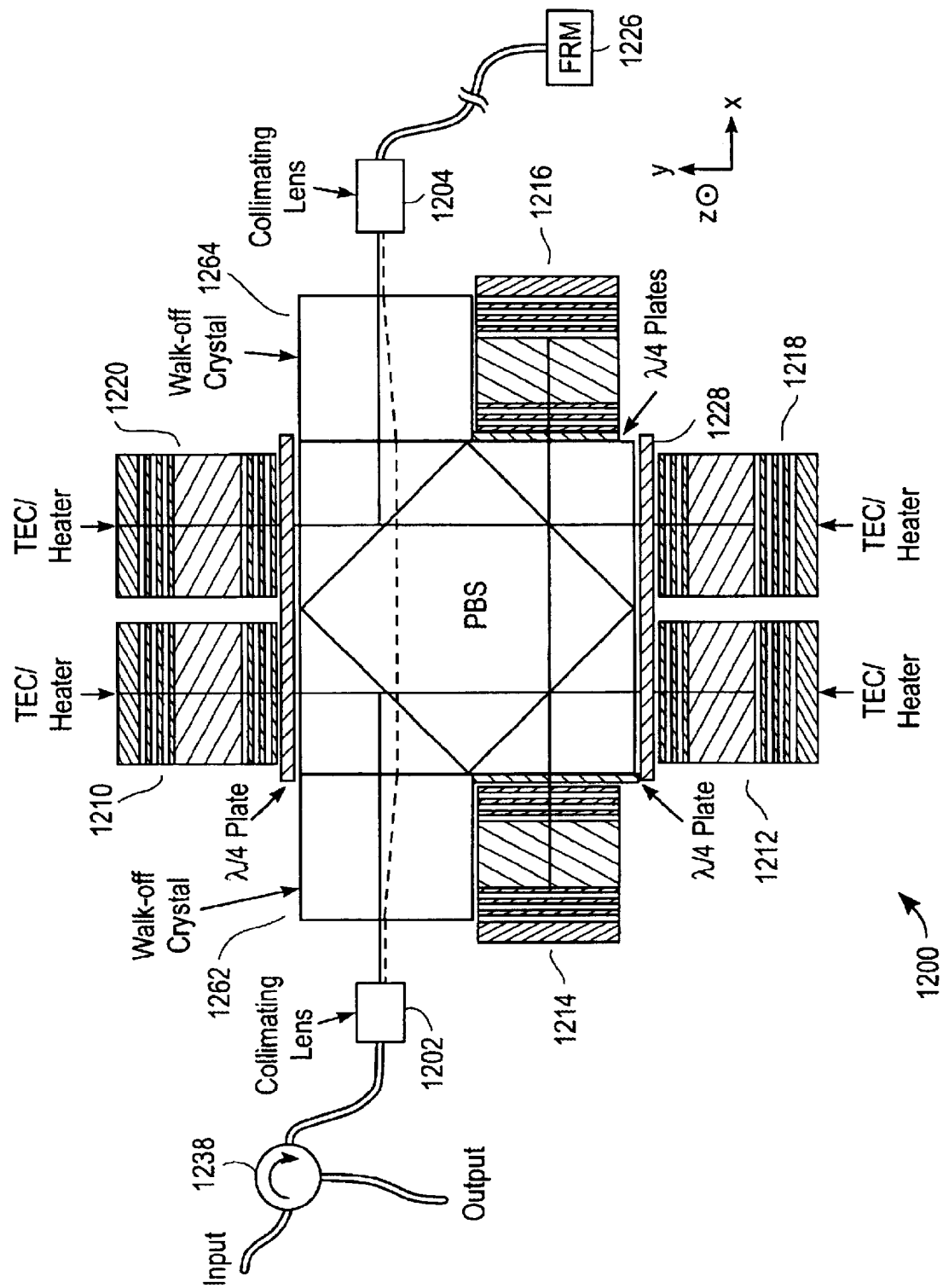
FIG. 12a illustrates an alternative embodiment of a chromatic dispersion compensation module.
Figure 12B:
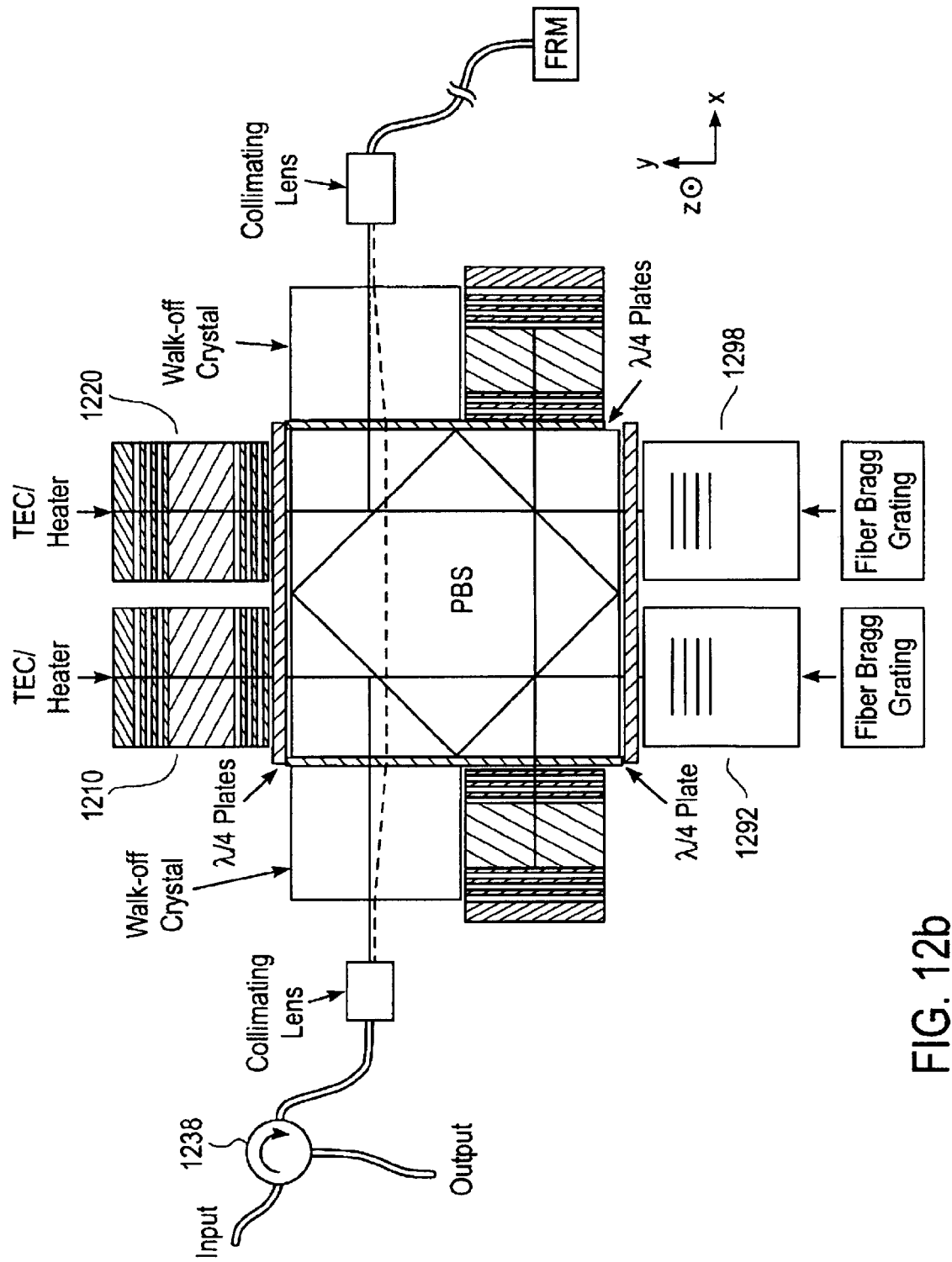

FIG. 12 illustrates an alternative embodiment of a chromatic dispersion compensation module. The chromatic dispersion compensation module 1200 includes six resonator cavities 1210–1220, a diamond shaped polarization beam splitting prism 1268, two walk-off crystals 1262, 1264, two radiation paralleling device 1202, 1204, eight polarization rotator such as a quarter wave plate 1228 coupled to a 100% reflective resonator, and a ninth polarization rotator 1226 such as a Faraday rotating mirror.

The optical signal upon exiting the first walk-off crystal 1262 comprises the first polarized light signal and the second polarized light signal. The first polarized light signal strikes the polarization beam splitting prism 1268 and reflects at an angle up into the first resonator cavity 1210 because the first polarized light signal has a transverse magnetic polarization. The first polarized light signal exits from the first resonator cavity 1210 having some wavelength delay induced into the signal and now possess an orthogonal polarization. When the first polarized light signal once again propagates into the polarization beam splitting prism 1268, the first polarized light signal having now a transverse electric polarization propagates straight through the polarization beam splitting prism 1268 to the second resonator cavity 1212. The second resonator cavity 1212 induces wavelength delays upon this first polarized light signal and orthogonalizes the first polarized light signal.

Upon exiting the second resonator cavity 1212, the first polarized light signal reflects off the polarization beam splitting prism 1268 into the third resonator cavity 1214. The first polarized light signal continues through the wavelength-dependant delay path eventually going through the polarization beam splitting prism 1268, and the fourth resonator cavity 1216, fifth resonator cavity 1218, and sixth resonator cavity 1220 until it finally enters into the second radiation paralleling device 1204. The ninth polarization rotator 1226 orthogonalizes the first polarized light signal and routes the signal back out through the radiation paralleling devices 1202, 1204 into the optical circulator 1238.

The second polarized light signal travels in substantially the opposite path of the first polarized light signal. The second polarized light signal propagates from the first radiation paralleling device 1202 through the first walk-off crystal 1262, through the polarization beam splitting device 1268, through the second walk of crystal 1264, through the second radiation paralleling device 1204 into the ninth polarization rotator 1226. Upon exiting the ninth polarization rotator 1226, the second polarized light signal routes in the opposite wavelength-dependant delay path that the first polarized light signal went through. Thus, the second polarized light signal propagates through the polarization beam splitting prism 1268 into the sixth resonator cavity 1220 and eventually through the other resonator cavities 1218, 1216, 1214, 1212, 1210. Upon exiting the first resonator cavity 1210, the second polarized light signal routes to the first radiation paralleling device 1202 and then out to the input output circulator 1238.

As noted above, the delay response of a single resonator's cavity exists for different values of front mirror reflectivity, thickness, or cavity temperature. The all-pass filter produces a variation in time delay due to the resonate circulation of some wavelengths within the cavity. For wavelengths that are on resonance, the light effectively stays inside the cavity longer than for wavelengths that are off resonance. This causes a wavelength-dependent delay that produces dispersion. For one embodiment, this wavelength delay (t) is given by the equation:

$$\tau(\lambda) = \left(\frac{2n_g d}{c}\right) \frac{1-\rho^2}{1+\rho^2 - 2\rho\cos\left(\frac{4\pi n_g d}{\lambda}\right)}$$

where r is the front mirror amplitude reflectivity, d is the etalon thickness, $i_o$ is the wavelength of the light in vacuum, and $n_g$ is the group index of refraction. A change in the cavity temperature changes the group index of refraction $n_g$ for the resonator cavity. Essentially, the equation illustrates that at a particular wavelength such as 1549.1 nm the amount of delay induced may be increased or decreases by changing a variable such as temperature in the equation 1.1. Further the equation illustrates that the center wavelength of the resonator cavity may be increased or decreased by changing a variable such as temperature in the equation 1.1.

The ability to change the center wavelength in each stage of the cascaded resonator cavities independent of affecting the other stages allows a change in the magnitude of chromatic dispersion in a passband of wavelengths in an optical signal with an approximately negligible variation in the chromatic dispersion across the passband.

Figure 1:
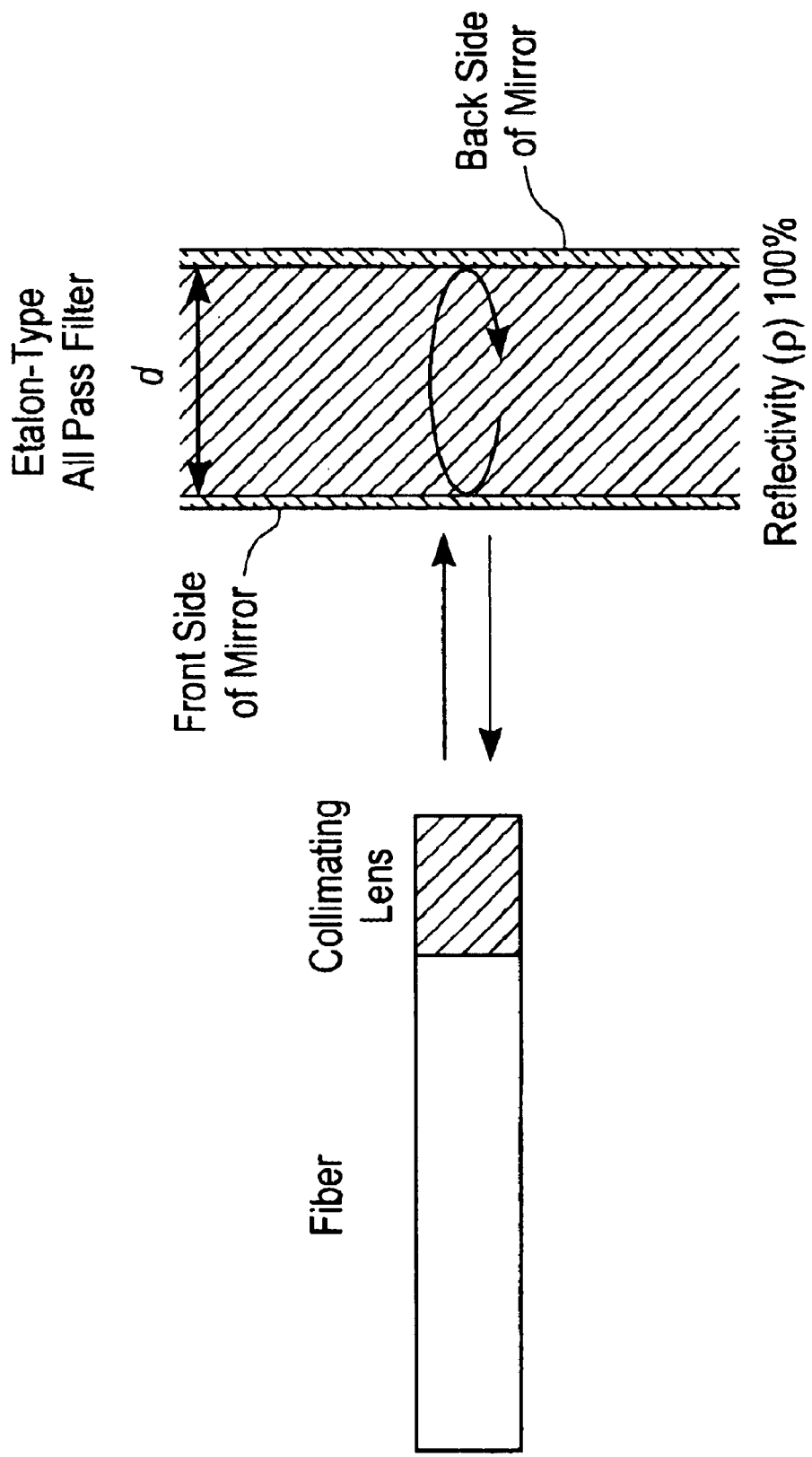
FIG. 1 illustrates a basic etalon-type all-pass filter.
Figure 2:
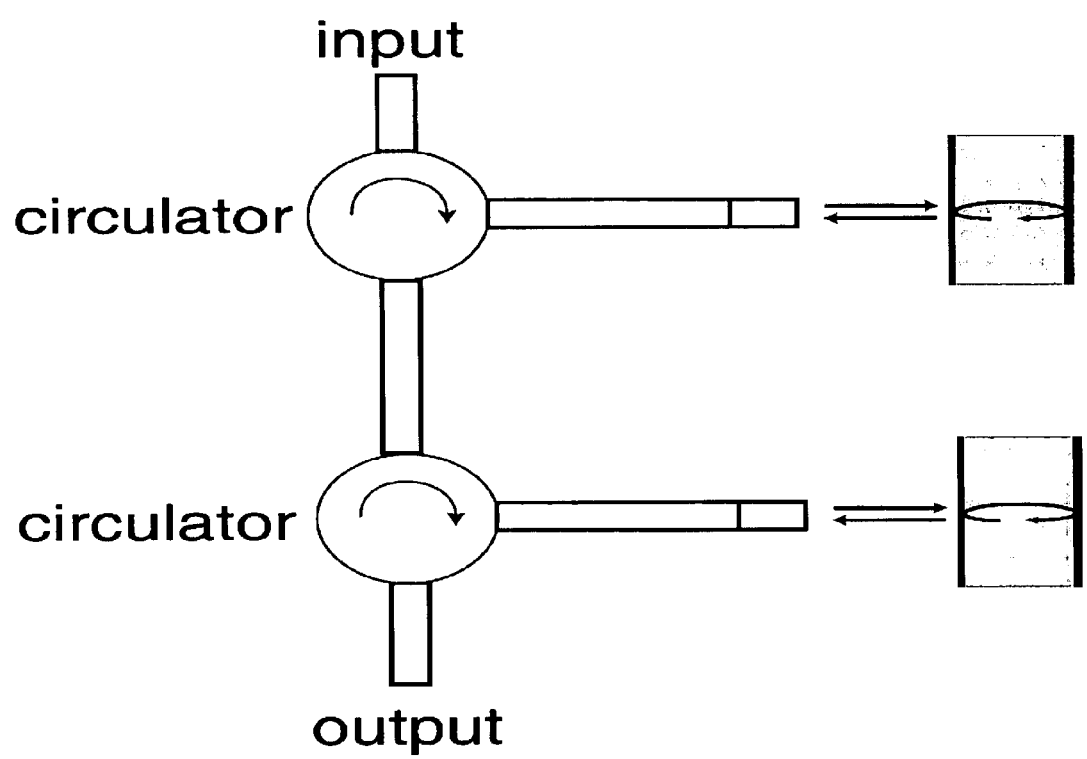
FIG. 2 illustrates a chain of resonators coupling to circulators.
Figure 3:
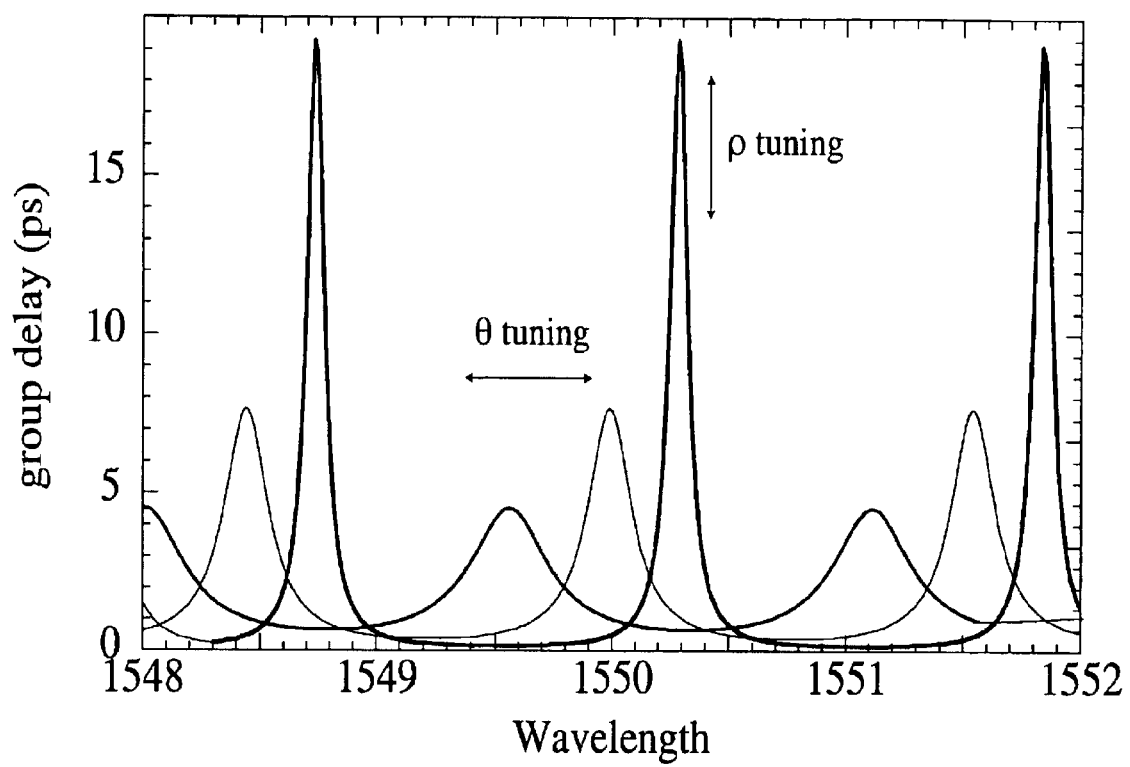
FIG. 3 illustrates the chromatic dispersion response of a single basic etalon-type resonator.
Figure 4:
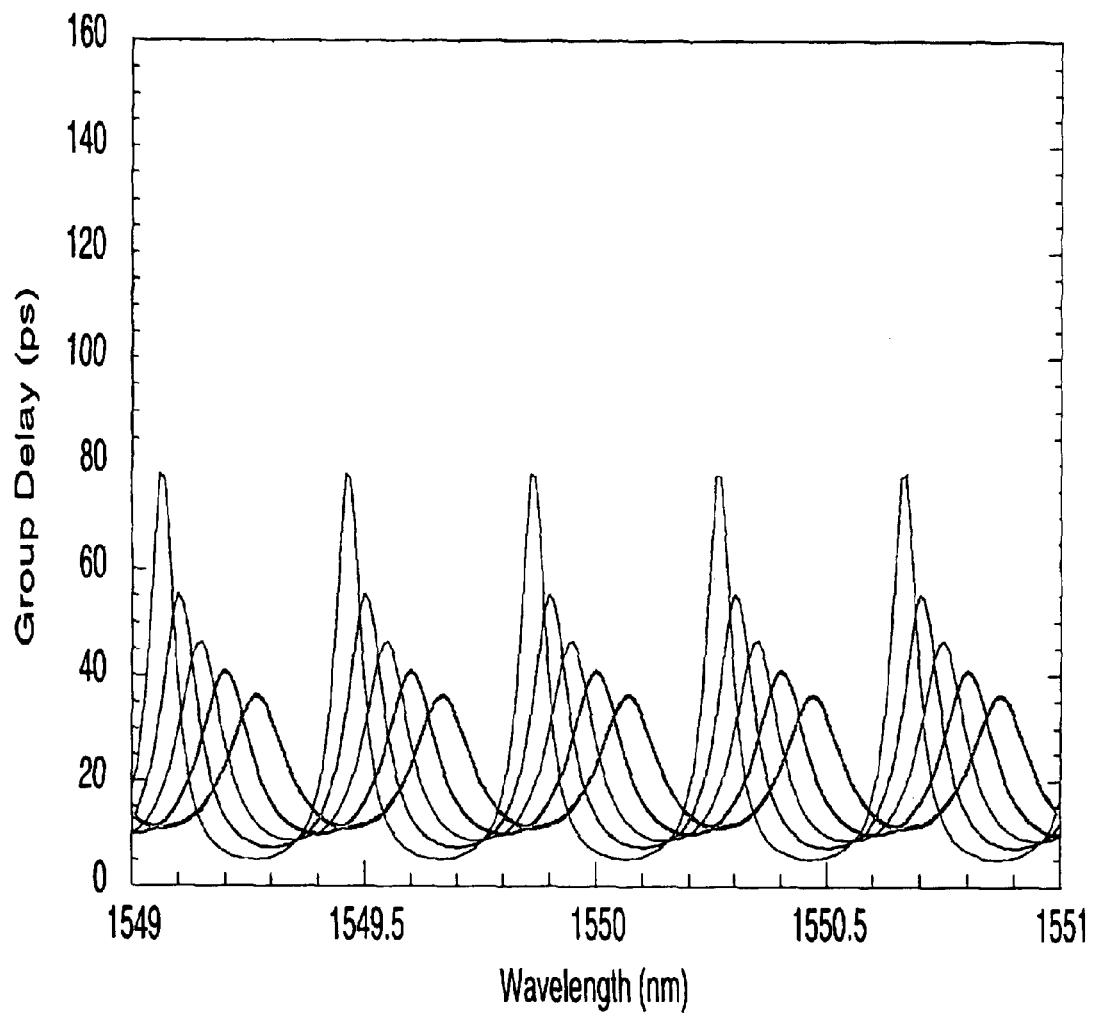
FIG. 4 illustrates an exemplary first passband of wavelengths from 1549.1 nm to 1549.3 that incur chromatic dispersion from a set of basic etalon-type resonator to counteract the chromatic dispersion that occurs when those wavelengths propagate through the fiber optic transmission system.
Figure 13:
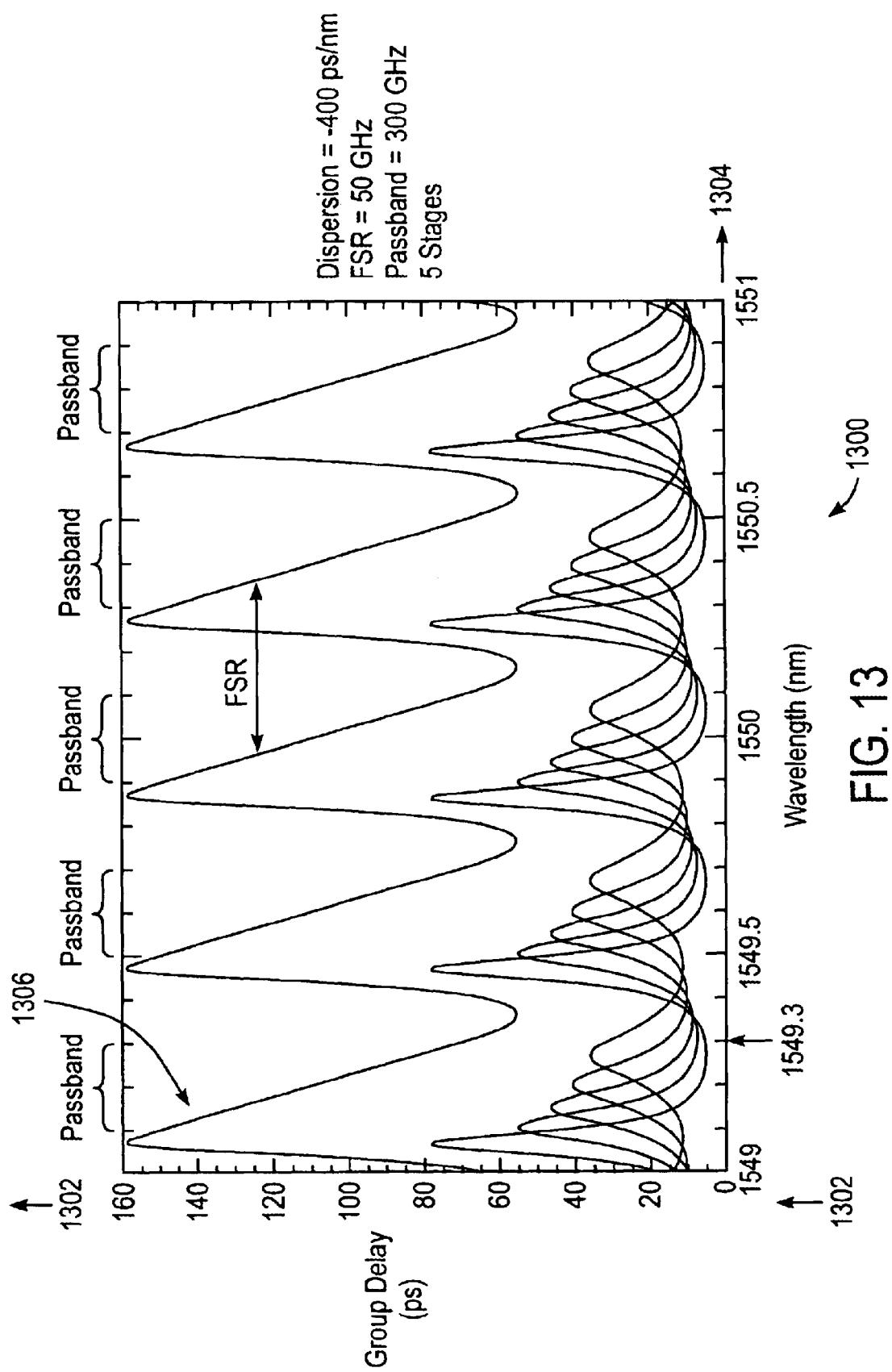
FIG. 13 illustrates an exemplary response of a set of five all-pass resonant cavities designed to give a constant linear group dispersion of minus four hundred picoseconds per nanometer (ps/nm) over a passband of thirty GHz.

FIG. 13 illustrates an exemplary response of a set of five all-pass resonant cavities designed to give a constant linear group dispersion of minus four hundred ps/nm over a passband of thirty GHz. Similar to FIG. 4, the passband of wavelength from 1549.1 nm wavelength to 1549.3 nm has dispersed over eighty ps. The response graph 1300 illustrates vertically delay incurred by each resonator cavity in order to counteract the chromatic dispersion caused by the transmission system 1302 and horizontally the wavelengths affected by each resonator cavity 1304. The graph also illustrates the linear slope of delay on a set passband of wavelengths 1306 generated by the cumulative effects of the cascaded resonator cavities each tuned to a potentially different center wavelength.

In the passband of wavelengths 1549.1 nm to 1549.3 nm, the pulse containing the 1549.3 nm wavelength trails the 1549.1 nm pulse by approximately eighty ps due to the chromatic dispersion in the fiber. The Free Spectral Range of the resonator is fifty GHz and thus this device can provide a linear slope 1306 dispersion of minus four hundred ps/nm for each channel of a WDM telecom system as long as the channel width is less than thirty GHz and the channel spacing is a multiple of fifty GHz.

In order to counteract the chromatic dispersion induced by the fiber optic transmission system, the cascaded etalon-type all-pass filters produce a delay on all of the wavelengths in the passband to put all of the wavelengths into the same timeframe. Since the 1549.1 nm wavelength leads the 1549.3 nm wavelength by eighty ps, the basic etalon-type all-pass filter induces a linear wavelength delay of one hundred and fifty ps at 1549.1 nm, one hundred and ten ps at 1549.2 nm, and seventy ps at 1549.3 nm to counter the chromatic dispersion effects of the transmission system. All three wavelengths in the passband then incur the same accumulative wavelength delay from the resonators and the transmission system to place the three wavelengths in the same time frame.

Thus, the chromatic dispersion effects in the transmission system induces a delta eighty ps wavelength delay on the 1549.3 nm wavelength and the etalon-type all-pass filter induces a seventy ps wavelength delay on the 1549.3 nm wavelength in order to incur a total one hundred and fifty ps delay. Accordingly, the etalon-type all-pass filter induces a one hundred and fifty ps wavelength delay on the 1549.1 nm wavelength in order for that wavelength to incur the same total one hundred and fifty ps delay.

Figure 14:
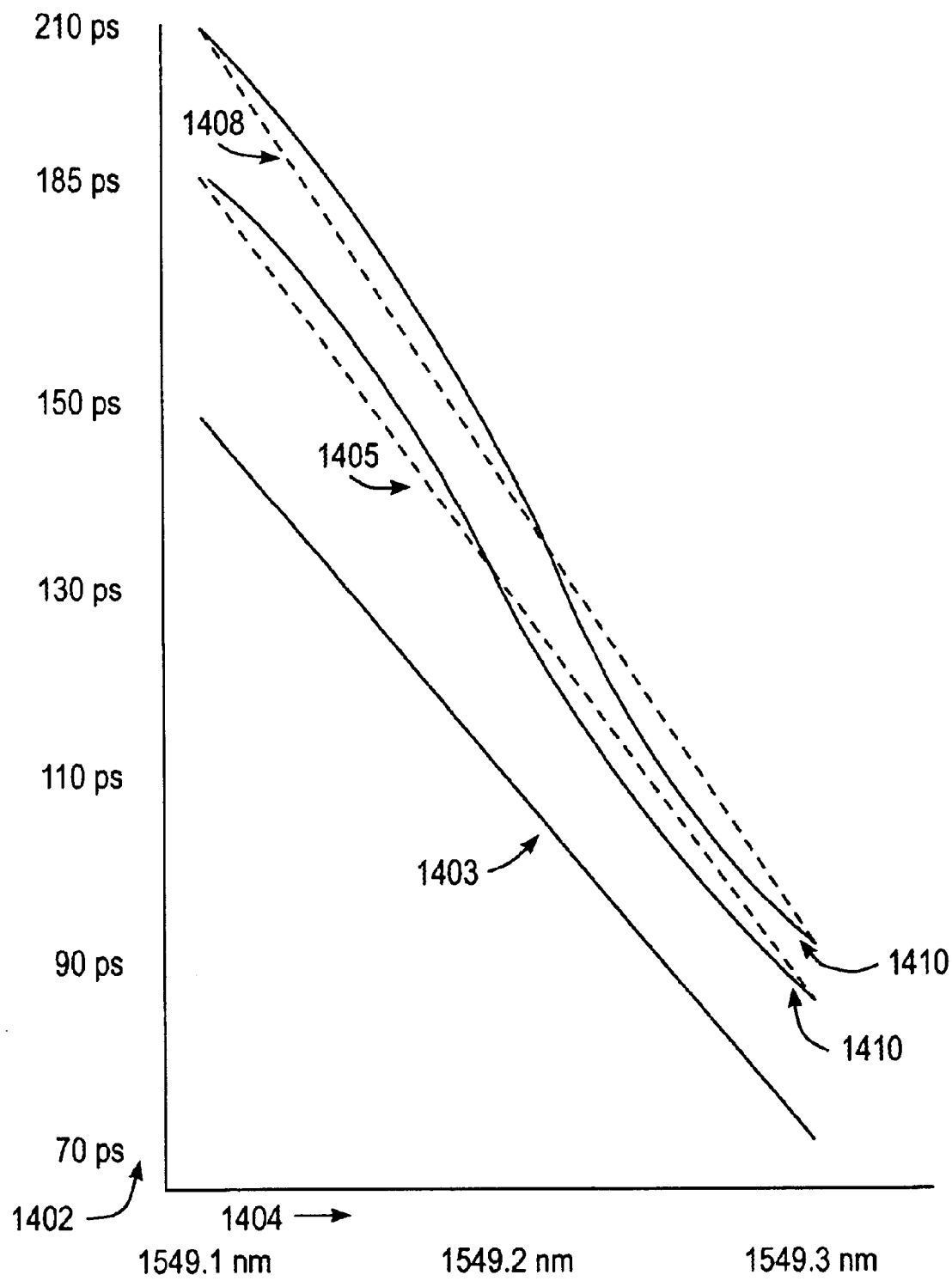
FIG. 14 illustrates a response graph of an exemplary change in the magnitude of chromatic dispersion in a passband of wavelengths by changing the optical thickness of one or more resonator cavities such that the induced variation in the chromatic dispersion across the passband produces a distortion of an optical signal propagated through the resonator cavities.

FIG. 14 illustrates a response graph of an exemplary change in the magnitude of chromatic dispersion in a passband of wavelengths by changing the optical thickness of one or more resonator cavities such that the induced variation in the chromatic dispersion across the passband produces a distortion of an optical signal propagated through the resonator cavities. The response graph 1400 vertically illustrates the magnitude of delay for each wavelength in a passband of wavelengths 1402 and horizontally the wavelengths within that passband 1404. The graph illustrates a base magnitude of chromatic dispersion for the passband of wavelengths 1403, a first increase from that base magnitude of chromatic dispersion 1405 for that passband of wavelengths, and a second increase from that base magnitude of chromatic dispersion 1408 for that passband of wavelengths. The dashed lines of 1405, 1408 represent the ideal delay curves for an exemplary first increase and second increase in dispersion because they are linear curves. A linear variation in delay across the passband produces a constant dispersion within the passband. Thus, dispersion increases represented by lines 1405, 1408 do not induce any variation in dispersion within the passband (dispersion ripple). The solid lines 1410 represent exemplary non-ideal delay curves for the first and second increase in dispersion. These curves are not linear and therefore represent a case in which there is a dispersion ripple in the passband and variation of the chromatic dispersion across the passband of wavelengths. Note, dashed lines 1405, 1408 also represent the mean dispersion compensation over the entire passband.

For one embodiment, the temperature is the only variable that changes in a series of resonator cavities to cause a change in the magnitude of chromatic dispersion in a passband of wavelengths in an optical signal. The temperature may be independently increased or decreased in each resonator in order to change the optical thickness of that resonator cavity. Correspondingly, the change of the optical thickness changes the magnitude of the chromatic dispersion. A small variation in the chromatic dispersion across the passband of wavelengths occurs as the magnitude of chromatic dispersion is raised and lowered. The variation consists of a deviation from the mean value over the passband, e.g. curves 1410. In an embodiment, the distortion of the optical signal due to variation in the chromatic dispersion across the passband incurs a Q-penalty of less than one decibel. The Q-penalty also known as the eye-opening penalty is a quantitative measure of quality of a given signal. Typically, the lower the Q-penalty measured in decibels (db), the better the quality of the chromatic dispersion over the entire passband. A passband is typically the group of wavelengths that originally entered the transmission system as a single pulse. Thus, the variation across the passband remains relatively small represented by exemplary lines 1410. Previous technologies when changing the magnitude of the chromatic dispersion induced large ripple variations throughout the average value of chromatic dispersion compensation across the passband.

For example, the magnitude of the delay for a given wavelength may be seventy ps on the 1549.3 nm wavelength. The base magnitude chromatic dispersion 1403 on the 1549.3 nm wavelength may be raised by twenty ps to ninety ps. An small variation in the chromatic dispersion 1410 occurs. The slope of the delay increases as the magnitude of chromatic dispersion 1402 increases. Correspondingly, approximately one hundred and eight-five ps (150 ps+35 ps) of chromatic dispersion compensation exists at 1549.1 nm and approximately ninety ps (70 ps+20 ps) of chromatic dispersion compensation exists at 1549.3 nm. Similarly, the base magnitude chromatic dispersion 1403 on the 1549.3 nm wavelength may be raised by thirty ps to one hundred ps. The 1549,1 nm wavelength incurs a delay of two hundred and ten ps (150 ps+60 ps). In both cases the distortion of the optical signal due to variation in the chromatic dispersion across the passband incurs a Q-penalty of less than one decibel.

FIG. 15 illustrates the path of the first polarized light signal through the wavelength-dependant delay path in an alternative embodiment of a chromatic dispersion compensation module. For one embodiment, the wavelength-dependant delay path couples to the an input collimator 1502, an output collimator 1504. For one embodiment, the wavelength-dependant delay path includes components such as three beam spatial orientation devices 1506, 1508, 1510, sixteen polarization rotators 1512–1542, six resonator cavities 1544–1556 each coupled to a temperature control device 1558–1568 respectively. The polarization rotators 1512–1542 couple to the beam spatial orientation devices 1506, 1508, 1510 such that the first polarized light signal and the second polarized light signal travel substantially similar paths through the chromatic dispersion compensation module 1500. For one embodiment, each beam spatial orientation device 1506, 1508, 1510 may be a walk-off crystal and each polarization rotator 1512–1542 may be either a positive or negative forty-five degree Faraday rotator coupled to a half wave plate.

The light pulse enters an input collimator 1502 and is collimated. The input collimator 1502 couples the light pulse to the first beam spatial orientation devices 1506 where the light pulse separates into the first polarized light signal and the second polarized light signal having an orthogonal polarization to the first polarized light signal. As noted above, the first polarized light signal may have, for example, a transverse electric wave polarization. The second polarized light signal correspondingly would then have a transverse magnetic polarization. Note, the path of the first polarized light signal is described in FIG. 15 and the path of the second polarized light signal is described in FIG. 16.

The first polarized light signal having a transverse electric polarization travels straight through the first beam spatial orientation devices 1506. The first polarized light signal then travels through a first polarization rotator 1512 such as a +45° Faraday Rotator and a half-wave plate. The +45° Faraday Rotator rotates the state of polarization by +45°, and the half-wave plate, with its birefringent axis oriented at +22.5° to the x-axis in the xy plane rotates the light by −45°, leaving the polarization of the first polarized light signal unchanged after traveling through the +45° FR and half-wave plate.

The first polarized light signal travels then travels straight through second beam spatial orientation devices 1508. The first polarized light signal then propagates to a ninth polarization rotator 1528 such as −45° FR and a half-wave plate. The birefringent axis of this waveplate is oriented at +22.5° to the x-axis in the xy plane, and the first polarized light signal is rotated to the orthogonal polarization (transverse magnetic) by this combination of a −45° Faraday Rotator and half waveplate. The first polarized light signal having a transverse magnetic polarization then travels at an upward angle in the third beam spatial orientation device 1510. The first polarized light signal enters the first resonator cavity 1552 and incurs wavelength delays. The first polarized light signal reflects off the back mirror of the first resonator cavity 1552 and travels back through the third beam spatial orientation device 1510.

The first polarized light signal exits the third beam spatial orientation device 1510 to enter the ninth polarization rotator 1528. The first polarized light signal travels backwards through the ninth polarization rotator 1528 previously traveled through. Because of the change of direction through the ninth polarization rotator 1528, the −45 Faraday Rotator now rotates the first polarized light signal by +45°. The half-wave plate portion of the ninth polarization rotator 1528, with its birefringent axis oriented at +22.5° to the x-axis in the xy plane rotates the light by −45°, leaving the polarization of the first polarized light signal unchanged after traveling through the −45° Faraday Rotator and half-wave plate.

Note, in an embodiment, when the first polarized light signal travels in the forward direction through a −45 degree Faraday rotator the polarization of the light signal rotates by a minus −45 degrees. When the first polarized light signal travels in the backward direction through a −45 degree Faraday rotator, the polarization of the light signal rotates by a positive 45 degrees. Similarly, when the first polarized light signal travels in the forward direction through a +45 degree Faraday rotator the polarization of the light signal rotates by a positive 45 degrees. When the first polarized light signal travels in the backward direction through a +45 degree Faraday rotator, the polarization of the light signal rotates by a minus 45 degrees.

The first polarized light signal having a transverse electric polarization exits the ninth polarization rotator 1528 to enter the second beam spatial orientation device 1508. The first polarized light signal travels upward in the second beam spatial orientation device 1508 towards the second resonator cavity 1548. The first polarized light signal enters the third polarization rotator 1516 that includes a +45 degree rotator. The third polarization rotator 1516 changes the polarization of the first polarized light signal from transverse magnetic to transverse electric. The first light signal travels straight through the first beam spatial orientation device 1506 to enter the second resonator cavity 1548. The first light signal enters the second resonator cavity 1548 and incurs wavelength delays. The first polarized light signal reflects off the back mirror of the second resonator cavity 1548 and travels back through the first beam spatial orientation device 1506. The first polarized light signal possesses a transverse electric polarization similar to the first time the first polarized light signal traveled through the first beam spatial orientation device 1506.

The process of routing the first light signal through the series of resonator cavities based upon the polarization of the first light signal is repeated until the first polarized light signal exits on the output collimator 1504. For example, the first polarized light signal propagates in the forward direction through the third polarization rotator 1516, retains it polarization, the second beam spatial orientation device 1508, the eleventh polarization rotator 1532, changes it polarization, the third beam spatial orientation device 1510 at an upward angle, and the third resonator cavity 1554 to incur wavelength delays. The first polarized light signal propagates in the backward direction through the third beam spatial orientation device 1510, the eleventh polarization rotator 1532, retains it polarization, the second beam spatial orientation device 1508 at an upward angle, the fifth polarization rotator 1520, changes it polarization to the transverse electric polarization, the first beam spatial orientation device 1506, and enters the fourth resonator cavity 1550. The first polarized light signal possesses a transverse electric polarization similar to the first time the first polarized light signal traveled through the first beam spatial orientation device 1506.

The first polarized light signal reflects back out the fourth resonator cavity 1550 propagating through polarization rotators and beam spatial orientation devices eventually to the fifth resonator cavity 1556, backwards to the sixth resonator cavity 1544, and then forwards to the output collimator 1504.

FIG. 16 illustrates the path of the second polarized light signal through the wavelength-dependant delay path superimposed over the path of the second polarized light signal in an alternative embodiment of a chromatic dispersion compensation module. As noted above, the light pulse enters an input collimator 1502 and is collimated. The input collimator 1502 couples the light pulse to the first beam spatial orientation devices 1506 where the light pulse separates into the first polarized light signal and the second polarized light signal having an orthogonal polarization to the first polarized light signal. The path of the second polarized light signal is described in FIG. 16.

The second polarized light signal having a transverse magnetic polarization travels at an upward angle through the first beam spatial orientation devices 1506. The second polarized light signal then travels through a second polarization rotator 1514 such as a −45° Faraday Rotator and a half-wave plate. The −45° Faraday Rotator rotates the state of polarization by −45°, and the half-wave plate, with its birefringent axis oriented at +22.5° to the x-axis in the xy plane rotates the light by −45°, changing the polarization of the second polarized light signal to transverse electric.

The second polarized light signal travels then travels straight through second beam spatial orientation devices 1508. The second polarized light signal then propagates to a tenth polarization rotator 1530 such as −45° FR and a half-wave plate. The birefringent axis of this waveplate is oriented at +22.5° to the x-axis in the xy plane. The second polarized light signal retains its polarization. The second polarized light signal having a transverse electric polarization then travels straight through the third beam spatial orientation device 1510. The second polarized light signal enters the first resonator cavity 1552 and incurs wavelength delays. The second polarized light signal reflects off the back mirror of the first resonator cavity 1552 and travels back through the third beam spatial orientation device 1510.

The second polarized light signal exits the third beam spatial orientation device 1510 to enter the tenth polarization rotator 1530. The second polarized light signal travels backwards through the tenth polarization rotator 1530 previously traveled through. Because of the change of direction through the ninth polarization rotator 1528, the +45 Faraday Rotator now rotates the second polarized light signal by −45°. The half-wave plate portion of the ninth polarization rotator 1528, with its birefringent axis oriented at +22.5° to the x-axis in the xy plane rotates the light by −45°, changing the polarization of the second polarized light signal.

The second polarized light signal having a transverse magnetic polarization exits the tenth polarization rotator 1530 to enter the second beam spatial orientation device 1508. The second polarized light signal travels upward in the second beam spatial orientation device 1508 towards the second resonator cavity 1548. The second polarized light signal enters in the backward direction the forth polarization rotator 1518 which includes a −45 degree rotator. The second light signal travels through the first beam spatial orientation device 1506 to enter the second resonator cavity 1548. The second light signal enters the second resonator cavity 1548 and incurs wavelength delays. The second polarized light signal reflects off the back mirror of the second resonator cavity 1548 and travels back through the first beam spatial orientation device 1506. The second polarized light signal possesses a transverse magnetic polarization similar to the first time the second polarized light signal traveled through the first beam spatial orientation device 1506.

The process of routing the second light signal through the series of resonator cavities based upon the polarization of the second light signal is repeated until the second polarized light signal exits on the output collimator 1504. The second polarized light signal reflects back out the second resonator cavity 1550 propagating through polarization rotators and beam spatial orientation devices eventually to the third resonator cavity 1554, backwards to the fourth resonator cavity 1550, forward to the fifth resonator cavity 1556, backwards to the sixth resonator cavity 1544, and then forwards to the output collimator 1504.

For one embodiment, a beam spatial orientation device may be a birefringent walkoff crystal, a polarization beam splitting prism, or other similar component. For one embodiment, a wavelength-dependant delay path may be cascaded resonator cavities, chirped fiber Bragg gratings 1292, 1298, a multilayer reflector that creates chromatic dispersion or another similar component. For one embodiment, a polarization rotator may be a Faraday rotating mirror, quarter wave plate coupled to a reflector, a 45 degree Faraday rotator coupled to reflector, a minus or positive 45 degree Faraday rotator coupled to a half wave plate, or a similar component. For one embodiment, a radiation paralleling device may be a collimating lens or similar component. The term coupled is defined as meaning optically connected either directly or indirectly through another optic component. For one embodiment, the center wavelength of the one or more resonators cavities is changed by altering the single variable of stress on the resonator cavities rather than temperature.

An optic transmission system may employ one or more embodiments of chromatic dispersion compensation modules. The optic transmission system may include a transmitter, a receiver, and one or more chromatic dispersion compensation modules coupled between the transmitter and the receiver.

For more alternative embodiments, most functions performed by electronic hardware components may be duplicated by software emulation.

In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are accordingly, to be regarded in an illustration rather then a restrictive sense.

I claim:

1. An apparatus, comprising:
   a chromatic dispersion compensation module including
   a beam spatial orientation device to separate an optical signal into a first polarized light signal and a second polarized light signal, the second polarized light signal being the orthogonal polarization of the first polarized light signal;
   a wavelength-dependent delay path coupled to the beam spatial orientation device, wherein the wavelength-dependent delay path includes three or more tunable cascaded resonator cavities and each resonator cavity is tuned to a different center wavelength to produce a distortion of the optical signal due to variation in the chromatic dispersion across the passband that incurs a Q-penalty of less than one decibel; and
   a polarization rotator coupled to the wavelength-dependent delay path such that the first polarized light signal reflects into the wavelength-dependent delay path in substantially the opposite direction of the second polarized light signal.

2. The apparatus of claim 1, further comprising:
   a radiation paralleling device coupled to an input output terminal; the radiation paralleling device also coupled to the beam spatial orientation device.

3. The apparatus of claim 1, wherein the first polarized light signal is a transverse electric wave.

4. The apparatus of claim 1, wherein the first polarized light signal is a transverse magnetic wave.

5. The apparatus of claim 1, wherein the beam spatial orientation device is a birefringent walkoff crystal.

6. The apparatus of claim 1, wherein the beam spatial orientation device is a polarization beam splitting prism.

7. The apparatus of claim 1, wherein each tunable cascaded resonator connects to a temperature control device.

8. The apparatus of claim 1, wherein the wavelength-dependent delay path further comprises a fiber Bragg grating.

9. The apparatus of claim 1, wherein the wavelength-dependent delay path further comprises a multilayer reflector that creates chromatic dispersion.

10. The apparatus of claim 1, wherein one or more of the tunable cascaded resonator cavities are tuned to a center wavelength by solely changing the temperature of that resonator cavity.

11. The apparatus of claim 1, wherein the polarization rotator is a Faraday rotating mirror.

12. The apparatus of claim 1, wherein the polarization rotator is a quarter wave plate coupled to a resonator cavity.

13. The apparatus of claim 12, wherein the wavelength-dependent delay path includes at least two or more polarization rotators to facilitate the first polarized light signal reflecting through the wavelength-dependent delay path in substantially the opposite direction of the second polarized light signal, and each polarization rotator consisting of the quarter wave plate coupled to the resonator cavity.

14. The apparatus of claim 2, wherein the radiation paralleling device is a collimator.

15. A method, comprising:
separating an optical signal into a first polarized light signal having a first polarization and a second polarized light signal having a second polarization, the second polarized light signal being the orthogonal polarization of the first polarized signal;
routing the first polarized light signal through a wavelength-dependent delay path in a first direction, and the second polarized light signal propagates through the wavelength-dependent delay path in a second direction substantially opposite the first direction; and
routing the first polarized light signal through a series of three or more cascaded resonator cavities, wherein each resonator cavity is tuned to a different center wavelength to produce a distortion of the optical signal due to variation in the chromatic dispersion across the passband that incurs a Q-penalty of less than one decibel.

16. The method of claim 15, further comprising:
collimating a light wave in an optical signal to possess the same angle of incidence.

17. The method of claim 15, further comprising:
changing the resonant center wavelength of one or more segments in the wavelength-dependent delay path by adjusting the temperature in that segment.

18. An apparatus, comprising:
means for separating an optical signal into a first polarized light signal having a first polarization and a second polarized light signal having a second polarization, the second polarized light signal being the orthogonal polarization of the first polarized indication;
means for routing the first polarized light signal through a wavelength-dependent delay path in a first direction and routing the second polarized light signal through the wavelength-dependent delay path in a second direction substantially opposite the first direction; and
means for routing the first polarized light signal through a series of three or more cascaded resonator cavities, wherein each resonator cavity is tuned to a different center wavelength to produce a distortion of the optical signal due to variation in the chromatic dispersion across the passband that incurs a Q-penalty of less than one decibel.

19. The apparatus of claim 18 further comprising:
means for collimating a light wave in an optical signal to possess the same angle of incidence.

20. An optic transmission system, comprising:
a transmitter;
a receiver;
one or more chromatic dispersion compensation modules coupled between the transmitter and the receiver, each chromatic dispersion compensation module including
a beam spatial orientation device to separate an optical signal into a first polarized light signal and a second polarized light signal, the second polarized light signal being the opposite polarization of the first polarized signal;
a wavelength-dependent delay path coupled to the beam spatial orientation device, wherein the wavelength-dependent delay path includes three or more tunable cascaded resonator cavities and each resonator cavity is tuned to a different center wavelength to produce a distortion of the optical signal due to variation in the chromatic dispersion across the passband that incurs a Q-penalty of less than one decibel; and
a polarization rotator coupled to the wavelength-dependent delay path such that the first polarized light signal reflects into the wavelength-dependent delay path in substantially the opposite direction of the second polarized light signal.

21. The system of claim 20, further comprising:
an input-output circulator coupled to the chromatic dispersion compensation module.

22. The system of claim 20, wherein the polarization rotator is a quarter wave plate coupled to a resonator cavity.

23. The system of claim 22, wherein the wavelength-dependent delay path includes at least two or more polarization rotators to facilitate the first polarized light signal reflecting through the wavelength-dependent delay path in substantially the opposite direction of the second polarized light signal, and each polarization rotator consisting of the quarter wave plate coupled to the resonator cavity.

24. The system of claim 20, wherein the polarization rotator is a forty-five degree Faraday rotator coupled to a resonator cavity.

25. A chromatic dispersion compensation module, comprising:
a collimator;
a first beam spatial orientation device coupled to the collimator;
a first polarization rotator coupled to the first beam spatial orientation device;
a first resonator cavity coupled to the first beam spatial orientation device;
a first temperature control device coupled to the first resonator cavity;
a second beam spatial orientation device;
a second polarization rotator coupled to the second beam spatial orientation device;

a second resonator cavity coupled to the second beam spatial orientation device;

a second temperature control device coupled to the second resonator cavity;

a third beam spatial orientation device coupled to a third resonator cavity; and a third temperature control device coupled to the third resonator cavity, wherein each resonator cavity is tuned to a different center wavelength to produce an approximately linear dispersion compensation across the entire passband that produces a Q-penalty of less than one decibel in an optical signal due to variation in the chromatic dispersion compensation.

26. The apparatus of claim 25, further comprising:

a fourth beam spatial orientation device coupled to the first polarization rotator and the second polarization rotator.

27. The apparatus of claim 26, wherein the first polarization rotator is a forty-five degree Faraday rotator coupled to a half wave plate.

28. The apparatus of 26, wherein the first polarization rotator couples to the first beam spatial orientation device and the second polarization rotator couples to the second beam spatial orientation device such that a first polarized light signal and a second polarized light signal having the orthogonal polarization of the first polarized light signal travel substantially similar paths through the chromatic dispersion compensation module.

29. An apparatus, comprising:

a chromatic dispersion compensation module including a beam spatial orientation device to separate an optical signal into a first polarized light signal and a second polarized light signal, the second polarized light signal being the orthogonal polarization of the first polarized light signal;

a wavelength-dependent delay path coupled to the beam spatial orientation device, wherein the wavelength-dependent delay path includes a fiber Bragg grating; and a polarization rotator coupled to the wavelength-dependent delay path such that the first polarized light reflects into the wavelength-dependent delay path in substantially the opposite direction of the second polarized light signal.

* * * * *